United States Patent
Anzai

(10) Patent No.: US 11,661,110 B2
(45) Date of Patent: *May 30, 2023

(54) FRONT STRUCTURE OF VEHICLE BODY

(71) Applicant: Honda Motor Co., Ltd., Tokyo (JP)

(72) Inventor: Hiroyuki Anzai, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 17/495,799

(22) Filed: Oct. 6, 2021

(65) Prior Publication Data

US 2022/0204086 A1 Jun. 30, 2022

(30) Foreign Application Priority Data

Dec. 24, 2020 (JP) .............................. JP2020-215280

(51) Int. Cl.
*B62D 21/15* (2006.01)
*B62D 25/14* (2006.01)
(Continued)

(52) U.S. Cl.
CPC ......... *B62D 21/152* (2013.01); *B62D 25/085* (2013.01); *B62D 25/145* (2013.01);
(Continued)

(58) Field of Classification Search
CPC .. B62D 21/152; B62D 25/085; B62D 25/145; B62D 27/00; B62D 21/155; B62D 25/082; B62D 21/11; B62D 25/08
(Continued)

(56) References Cited

U.S. PATENT DOCUMENTS

2017/0113735 A1* 4/2017 Kawabe ................. B60R 19/02
2022/0204088 A1* 6/2022 Anzai ................. B62D 25/082

FOREIGN PATENT DOCUMENTS

JP S49126017 12/1974
JP 2855411 2/1999
(Continued)

OTHER PUBLICATIONS

"Office Action of Japan Counterpart Application" with English translation thereof, dated Aug. 23, 2022, p. 1-p. 6.

*Primary Examiner* — Joseph D. Pape
*Assistant Examiner* — Dana D Ivey
(74) *Attorney, Agent, or Firm* — JCIPRNET

(57) ABSTRACT

A front portion of a vehicle body includes front side frames, a subframe, and a vehicle compartment front structure body. The subframe has a subframe body, a front fastening portion fastened to the front side frame in a front region of the subframe body, and a rear fastening portion fastened and fixed to the vehicle compartment front structure body in a rear region of the subframe body. The rear fastening portion has a first convex portion protruding toward a vehicle rear side. A part of a steering gear box constitutes a second convex portion protruding upward from the subframe body. The front fastening portion has a third convex portion protruding upward from the front region of the subframe body. The vehicle compartment front structure body has a first inclined guide portion, a second inclined guide portion, and a third inclined guide portion having front surfaces to contact the convex portions.

7 Claims, 16 Drawing Sheets

(51) Int. Cl.
*B62D 27/00* (2006.01)
*B62D 25/08* (2006.01)
*B62D 21/11* (2006.01)

(52) U.S. Cl.
CPC .............. *B62D 27/00* (2013.01); *B62D 21/11* (2013.01); *B62D 21/155* (2013.01); *B62D 25/08* (2013.01); *B62D 25/082* (2013.01)

(58) Field of Classification Search
USPC .................................................. 296/187.09
See application file for complete search history.

(56) References Cited

FOREIGN PATENT DOCUMENTS

| | | |
|---|---|---|
| JP | 2013129384 | 7/2013 |
| JP | 2014004990 | 1/2014 |
| JP | 2017132371 | 8/2017 |
| JP | 2018140711 | 9/2018 |
| WO | 2012060257 | 5/2012 |

* cited by examiner

FRONT STRUCTURE OF VEHICLE BODY

CROSS-REFERENCE TO RELATED APPLICATION

This application claims the priority benefits of Japanese application no. 2020-215280, filed on Dec. 24, 2020. The entirety of the above-mentioned patent application is hereby incorporated by reference herein and made a part of this specification.

BACKGROUND

Technical Field

The disclosure relates to a front structure of a vehicle body.

Description of Related Art

A structure of a front portion of a vehicle body is known, in which a dash lower panel that separates between a vehicle compartment and an engine room is provided with an inclined wall that inclines downward toward the vehicle rear side, and when an impact load is input from the front of the vehicle, mounted components that move rearward are dropped downward along the inclined wall (see Patent Document 1, for example).

In the front structure of the vehicle body described in Patent Document 1, an auxiliary plate is attached to the front surface side of the inclined wall of the dash lower panel, and a drive device such as an engine is arranged on the front side of the auxiliary plate. In this front structure of the vehicle body, when an impact load is input from the front of the vehicle and causes the drive device to come into contact with the auxiliary plate, the auxiliary plate is separated from the dash panel and the auxiliary plate, together with the drive device, falls downward along the inclined wall of the dash panel.

Related Art

Patent Document

[Patent Document 1] Japanese Patent No. 2855411

Problems to be Solved

The front structure of the vehicle body described in Patent Document 1 can drop the drive device downward when an impact load is input from the front of the vehicle to prevent entry of the drive device in the direction into the vehicle compartment. However, for many vehicles in recent years, a subframe is arranged on the rear side of the engine (drive device), and steering components and suspension components are supported by the subframe. In such vehicles, the structure described in Patent Document 1 cannot be adopted.

The subframe arranged in the engine room is erected below the left and right front side frames, and the rear end side portion is coupled to a vehicle compartment front structure body in front of the vehicle compartment. Further, on the upper portion of the subframe, mounted components such as a steering gear box are attached so as to bulge upward. In the case of such a front structure of the vehicle body, it is desired to smoothly drop the rigid subframe downward on the front side of the vehicle compartment when an impact load is input from the front of the vehicle.

However, since the entire subframe including the mounted components has a complicated three-dimensional shape, it is difficult to stably drop the subframe to the front side of the vehicle compartment when an impact load is input from the front of the vehicle.

SUMMARY

A front structure of a vehicle body according to the disclosure adopts the following configuration. That is, the front structure of the vehicle body according to the disclosure includes: a pair of left and right front side frames (for example, the front side frames 7 of the embodiment) extending to a front of a vehicle on a front side of a vehicle compartment; a subframe (for example, the subframe 8 of the embodiment) erected below the pair of front side frames; and a vehicle compartment front structure body (for example, the vehicle compartment front structure body 30 of the embodiment) arranged in a front portion of the vehicle compartment. The subframe includes: a subframe body (for example, the subframe body 41 of the embodiment) to which a steering gear box (for example, the steering gear box 40 of the embodiment) is attached on an upper surface side; a front fastening portion (for example, the front fastening portion 34 of the embodiment) fastened to the front side frame in a front region of the subframe body; and a rear fastening portion (for example, the rear fastening portion 35 of the embodiment) fastened and fixed to the vehicle compartment front structure body in a rear region of the subframe body. The rear fastening portion is provided with a first convex portion (for example, the convex portion 46 of the embodiment) that protrudes toward a vehicle rear side. A part of the steering gear box constitutes a second convex portion (for example, the motor 40a of the embodiment) that protrudes upward from the subframe body. The front fastening portion is provided on a third convex portion (for example, the leg portion 42 of the embodiment) that protrudes upward from the front region of the subframe body. The vehicle compartment front structure body includes: a first inclined guide portion (for example, the inclined guide portion 33 of the embodiment) having a front surface which inclines downward toward a rear of the vehicle and with which the first convex portion comes into contact along with rearward displacement of the subframe when an impact load is input from the front of the vehicle; a second inclined guide portion (for example, the inclined guide portion 60 of the embodiment) having a front surface which inclines downward toward the rear of the vehicle and with which the second convex portion comes into contact along with rearward displacement of the subframe when the impact load is input from the front of the vehicle; and a third inclined guide portion (for example, the inclined guide portion 24 of the embodiment) having a front surface which inclines downward toward the rear of the vehicle and with which the third convex portion comes into contact along with rearward displacement of the subframe when the impact load is input from the front of the vehicle.

DESCRIPTION OF THE EMBODIMENTS

Figure 1:
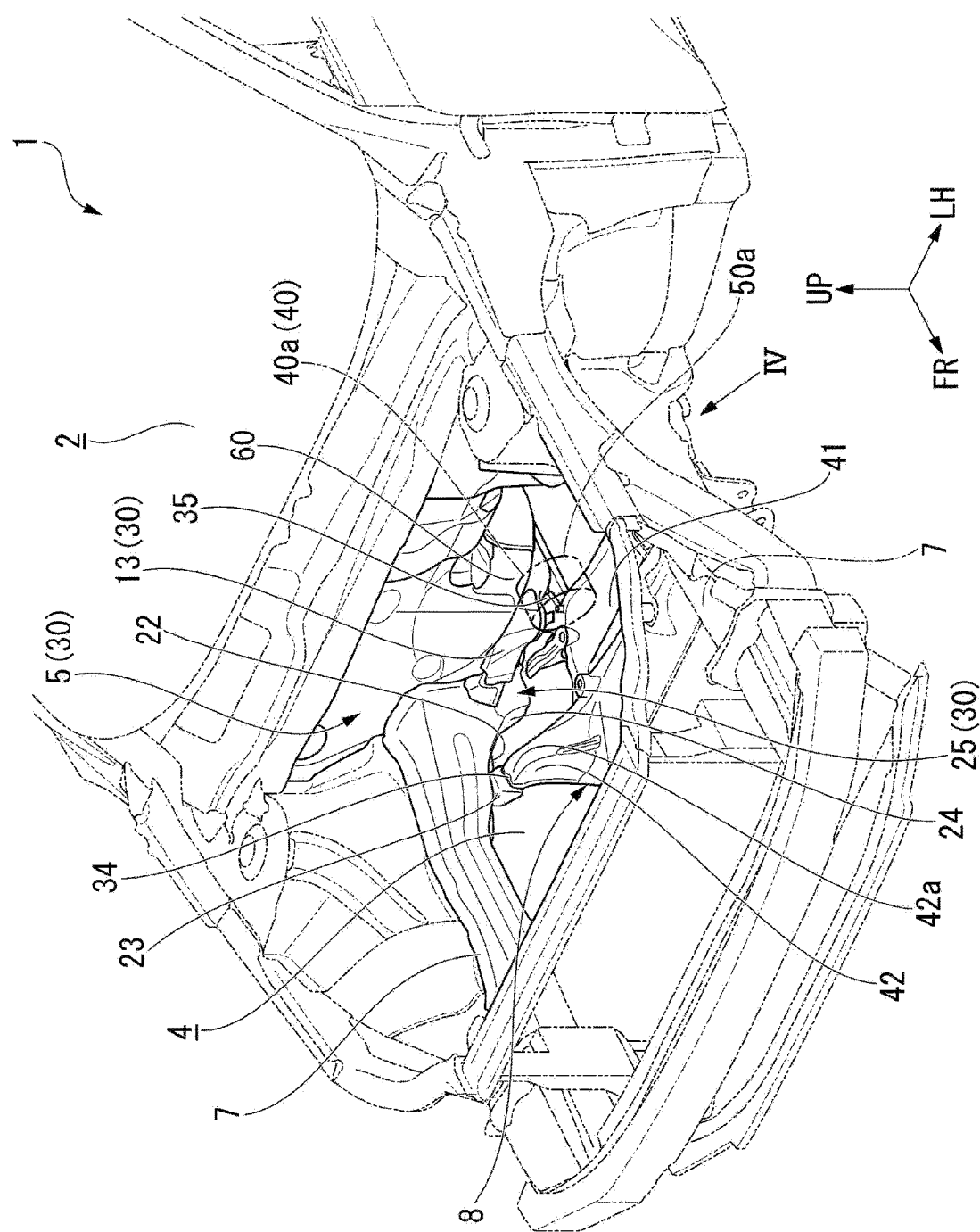
FIG. 1 is a perspective view of the front portion of the vehicle of the embodiment.

The disclosure provides a front structure of a vehicle body that can smoothly drop the subframe downward on the front side of the vehicle compartment when an impact load is input from the front of the vehicle.

Means for Solving the Problems

A front structure of a vehicle body according to the disclosure adopts the following configuration. That is, the front structure of the vehicle body according to the disclosure includes: a pair of left and right front side frames (for example, the front side frames 7 of the embodiment) extending to a front of a vehicle on a front side of a vehicle compartment; a subframe (for example, the subframe 8 of the embodiment) erected below the pair of front side frames; and a vehicle compartment front structure body (for example, the vehicle compartment front structure body 30 of the embodiment) arranged in a front portion of the vehicle compartment. The subframe includes: a subframe body (for example, the subframe body 41 of the embodiment) to which a steering gear box (for example, the steering gear box 40 of the embodiment) is attached on an upper surface side; a front fastening portion (for example, the front fastening portion 34 of the embodiment) fastened to the front side frame in a front region of the subframe body; and a rear fastening portion (for example, the rear fastening portion 35 of the embodiment) fastened and fixed to the vehicle compartment front structure body in a rear region of the subframe body. The rear fastening portion is provided with a first convex portion (for example, the convex portion 46 of the embodiment) that protrudes toward a vehicle rear side. A part of the steering gear box constitutes a second convex portion (for example, the motor 40a of the embodiment) that protrudes upward from the subframe body. The front fastening portion is provided on a third convex portion (for example, the leg portion 42 of the embodiment) that protrudes upward from the front region of the subframe body. The vehicle compartment front structure body includes: a first inclined guide portion (for example, the inclined guide portion 33 of the embodiment) having a front surface which inclines downward toward a rear of the vehicle and with which the first convex portion comes into contact along with rearward displacement of the subframe when an impact load is input from the front of the vehicle; a second inclined guide portion (for example, the inclined guide portion 60 of the embodiment) having a front surface which inclines downward toward the rear of the vehicle and with which the second convex portion comes into contact along with rearward displacement of the subframe when the impact load is input from the front of the vehicle; and a third inclined guide portion (for example, the inclined guide portion 24 of the embodiment) having a front surface which inclines downward toward the rear of the vehicle and with which the third convex portion comes into contact along with rearward displacement of the subframe when the impact load is input from the front of the vehicle.

In the above configuration, when an impact load is input from the front of the vehicle, the subframe is displaced toward the vehicle rear side along with the deformation of the left and right front side frames, and the first, second, and third convex portions that are arranged dispersedly on the subframe come into contact with the front surfaces of the first, second, and third inclined guide portions of the vehicle compartment front structure body. As a result, the convex portions at a plurality of locations on the subframe are guided by the corresponding inclined guide portions and fall downward.

Compared with a rigidity of one of the second convex portion and the third convex portion, a rigidity of the other of the second convex portion and the third convex portion may be high, and a front surface of an inclined guide portion, among the second inclined guide portion and the third inclined guide portion, on a side with which a convex portion on a side having a high rigidity comes into contact may be set to a gentle downward inclination angle compared with a front surface of an inclined guide portion on a side with which a convex portion on a side having a low rigidity comes into contact.

In this case, it is possible to suppress the indentation deformation of the inclined guide portion due to the convex portion on the side having a high rigidity coming into contact with the inclined guide portion having a steep inclination angle. Therefore, each convex portion can be smoothly slid on the corresponding inclined guide portion, and the subframe can be stably dropped downward.

The vehicle compartment front structure body may include: a tunnel frame (for example, the tunnel frame 11 of the embodiment) arranged along a vehicle front-rear direction below the vehicle compartment and extending to a position where a front end portion faces the subframe; and a dash lower panel (for example, the dash lower panel 5 of the embodiment) separating the vehicle compartment and a front compartment on a front side of the vehicle compartment. The first inclined guide portion may be provided at the front end portion of the tunnel frame so as to face the first convex portion of the subframe from the vehicle rear side. The second inclined guide portion may be provided at a portion of the dash lower panel, which faces the second convex portion of the steering gear box from the vehicle rear side. A separation distance between the first convex portion and the first inclined guide portion may be set shorter than a separation distance between the second convex portion and the second inclined guide portion.

In this case, when an impact load is input from the front of the vehicle and the subframe is displaced toward the vehicle rear side, first the first convex portion of the rear fastening portion comes into contact with the front surface of the first inclined guide portion at the front end portion of the tunnel frame, and the rear fastening portion is guided downward. Subsequently, the second convex portion of the steering gear box on the subframe comes into contact with the front surface of the second inclined guide portion of the dash lower panel, and the steering gear box is guided downward together with the subframe. At this time, since the steering gear box comes into contact with the front surface of the second inclined guide portion of the dash lower panel in a situation where the rear portion side of the subframe is being guided downward, the event that the steering gear box is prevented from falling due to the deformation of the dash lower panel does not occur.

The front side frame may include: a bending starting point (for example, the bending starting point 22 of the embodiment) which is a starting point of bending and deformation when the impact load is input from the front of the vehicle; and a subframe mounting portion (for example, the mounting bracket 23 of the embodiment) which is arranged on a front side of the bending starting point and to which the front fastening portion is fastened. A component mounting bracket (for example, the component mounting bracket 25 of the embodiment) may be coupled to a rear side of the bending starting point of the front side frame, and the third inclined guide portion may be provided on a front surface side of the component mounting bracket.

In this case, when an impact load is input from the front of the vehicle, the left and right front side frames bend and deform so that the front side portion of the starting point is lifted upward starting from the bending starting point, and the subframe is pressed toward the vehicle rear side. As a result, the front fastening portion of the subframe is separated from the subframe mounting portion of the corresponding front side frame on the left and right, and the third convex portion comes into contact with the front surface of the third inclined guide portion of the component mounting bracket along with the rearward displacement of the subframe. As a result, the third convex portion on the front portion side of the subframe is guided by the front surface of the third inclined guide portion, and the entire subframe falls smoothly downward.

The third inclined guide portion may be provided with a recessed portion (for example, the recessed portion 31 of the embodiment) that extends in a vertical direction.

In this case, the third inclined guide portion is reinforced by the recessed portion that extends in the vertical direction. Therefore, when the third convex portion of the subframe comes into contact with the third inclined guide portion at the time of input of an impact load from the front of the vehicle, the guide surface of the third inclined guide portion is less likely to be deformed. Therefore, the third convex portion of the subframe can be stably guided downward.

The vehicle compartment front structure body may include: a dash lower panel (for example, the dash lower panel 5 of the embodiment) separating the vehicle compartment and a front compartment on a front side of the vehicle compartment; and a dash cross member (for example, the dash cross member 55 of the embodiment) joined to a rear surface of the dash lower panel and extending along a vehicle width direction. The second inclined guide portion may be formed at a portion of the dash lower panel, which faces the second convex portion from the vehicle rear side, and the dash cross member may be joined to a rear surface of the second inclined guide portion.

In this case, the rear surface side of the second inclined guide portion of the dash lower panel with which the second convex portion of the steering gear box comes into contact when an impact load is input from the front of the vehicle is reinforced by the dash cross member. Therefore, the strength of the second inclined guide portion is increased, and when the second convex portion comes into contact with the front surface of the second inclined guide portion, the guide surface of the second inclined guide portion is less likely to be deformed. Therefore, the second convex portion of the subframe can be stably guided downward.

The rear fastening portion may include: a tubular body (for example, the tubular body 45 of the embodiment) through which a bolt (for example, the bolt 15 of the embodiment) penetrates in a vertical direction; and the first convex portion which protrudes from the tubular body toward the vehicle rear side. The vehicle compartment front structure body may include: a support plate (for example, the support plate 14 of the embodiment) extending substantially horizontally, in which the tubular body is fastened to a lower surface of the support plate by a bolt; and the first inclined guide portion which faces the first convex portion from the vehicle rear side at a position rearward of a portion of the support plate fastened by the bolt, and against which the first convex portion is pressed when the impact load is input from the front of the vehicle.

In this case, when an impact load is input from the front of the vehicle, the subframe is pressed toward the vehicle rear side, and the first convex portion protruding rearward from the tubular body of the rear fastening portion is pressed against the first inclined guide portion. At this time, the tubular body of the rear fastening portion receives a reaction force through the first convex portion, and the falling of the tubular body is restricted. As a result, the out-of-plane deformation of the support plate is suppressed. As a result, the fastening portion of the support plate breaks smoothly by receiving the load acting on the subframe. When the subframe retracts in this state, the first convex portion is guided by the front surface of the first inclined guide portion, and the subframe falls smoothly downward.

Effects

According to the disclosure, the first, second, and third inclined guide portions are provided in the vehicle compartment front structure body so as to correspond to the first, second, and third convex portions arranged dispersedly on the subframe, and when an impact load is input from the front of the vehicle, the first, second, and third convex portions come into contact with the front surfaces of the corresponding first, second, and third inclined guide portions to be guided downward. Therefore, even if the subframe including the mounted components has a complicated three-dimensional shape as a whole, the subframe can be smoothly dropped downward on the front side of the vehicle compartment when an impact load is input from the front of the vehicle.

Hereinafter, embodiments of the disclosure will be described with reference to the drawings. In addition, an arrow FR pointing to the front side of a vehicle, an arrow UP pointing to the upper side of the vehicle, and an arrow LH pointing to the left side of the vehicle are marked at appropriate positions in the drawings.

Figure 2:
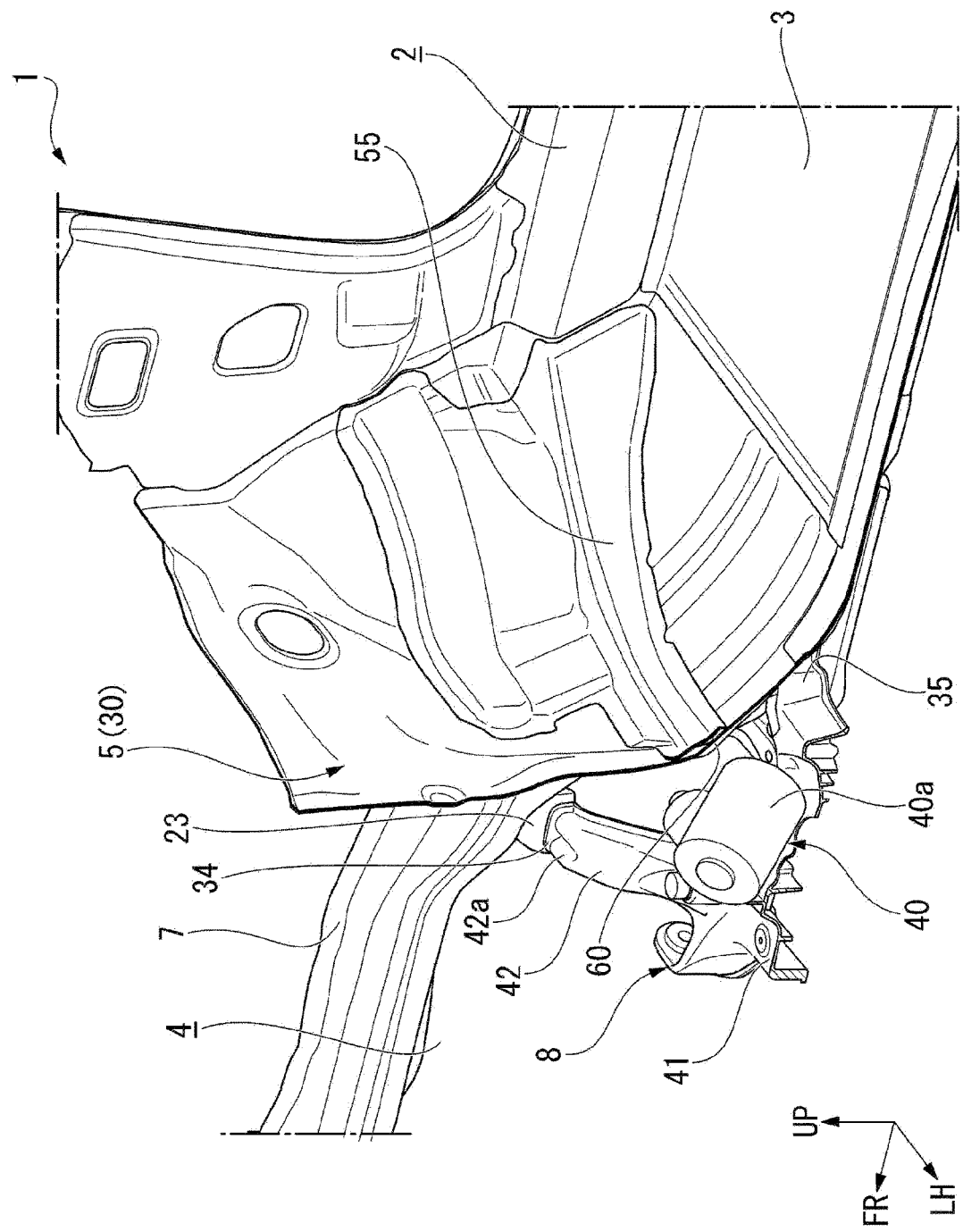
FIG. 2 is a partial cross-sectional perspective view of the front portion of the vehicle of the embodiment.
Figure 3:
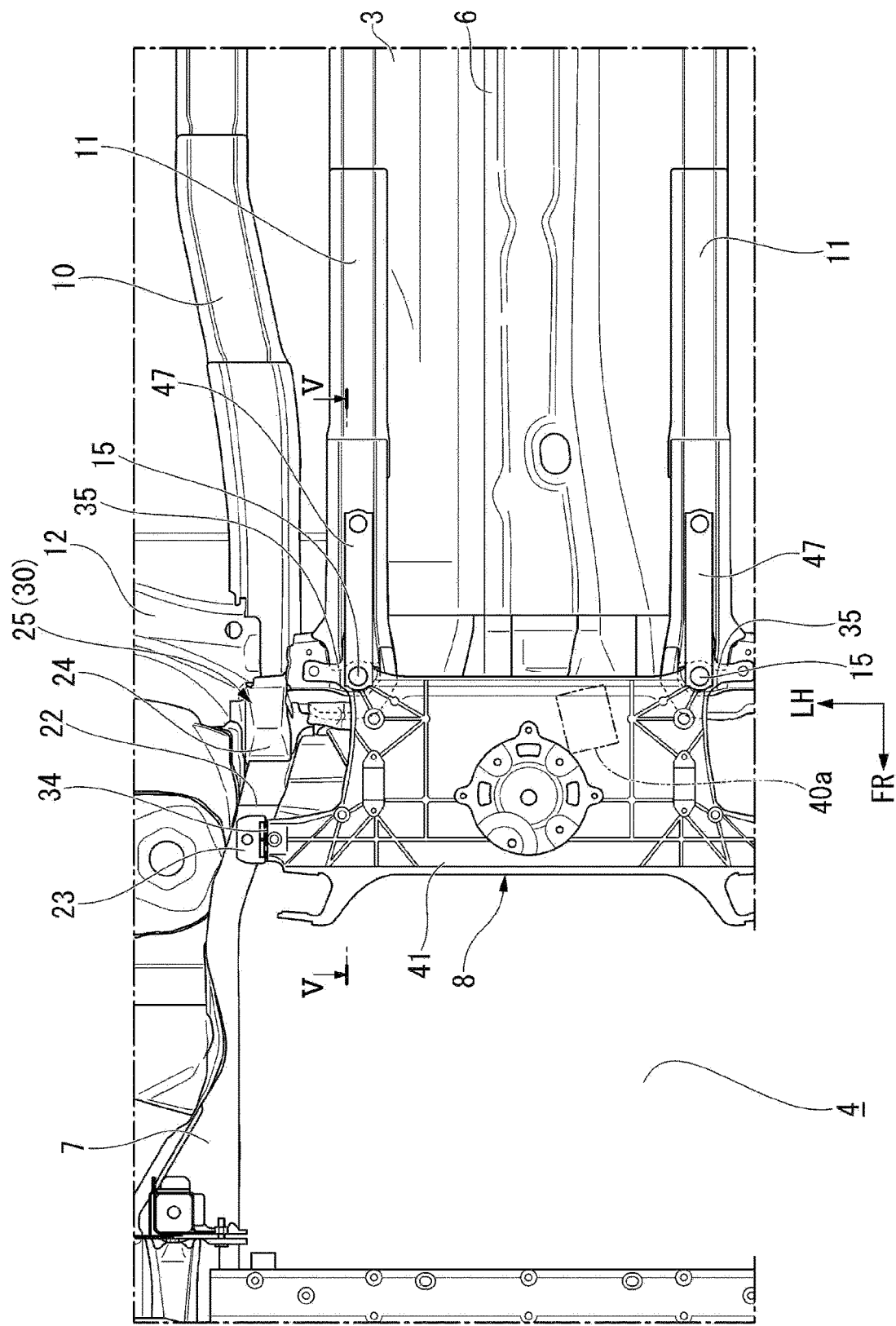
FIG. 3 is a bottom view of the front portion of the vehicle of the embodiment.

FIG. 1 is a perspective view of viewing the front portion of the vehicle 1 of the present embodiment from the upper left diagonally. FIG. 2 is a partial cross-sectional perspective view of cutting the front portion of the vehicle 1 at a portion slightly to the right of the center in a vehicle width direction, and viewing the portion from the rear left upper side diagonally. Further, FIG. 3 is a bottom view of the front portion of the vehicle 1. As shown in FIG. 2, the rear end portion of a dash lower panel 5 that separates a vehicle compartment 2 and an engine room 4 (front compartment) in front of the vehicle compartment 2 is joined to the front end portion of a floor panel 3 arranged below the vehicle compartment 2. The dash lower panel 5 stands diagonally upward on the front side from the joint with the floor panel 3. Further, as shown in FIG. 3, in the central portion of the floor panel 3 in the vehicle width direction, a floor tunnel portion 6 that bulges upward extends along a vehicle front-rear direction. The lower edge of the central region of the dash lower panel 5 in the vehicle width direction is connected to the front end portion of the floor tunnel portion 6, and the amount of bulge toward the front side is smaller than that of the other regions on the left and right.

A pair of left and right front side frames 7, which are the main skeleton members of the front portion of the vehicle body, are provided on the front side of the vehicle compartment 2. The left and right front side frames 7 extend toward the front of the vehicle on the left and right front sides of the vehicle compartment 2. A subframe 8 for supporting steering components and suspension components is erected below the left and right front side frames 7 near the rear portion. The subframe 8 is an aluminum casting having a substantially rectangular shape in the plan view, and is fixed to the left and right front side frames 7 and a vehicle compartment front structure body 30 (to be described later) by fastening bolts. A power unit (not shown) such as an engine or a drive motor is supported by a front frame portion (not shown) connected to the front portion of the subframe 8. The front frame portion is erected in the central region in the front-rear direction of the left and right front side frames 7.

Figure 4:
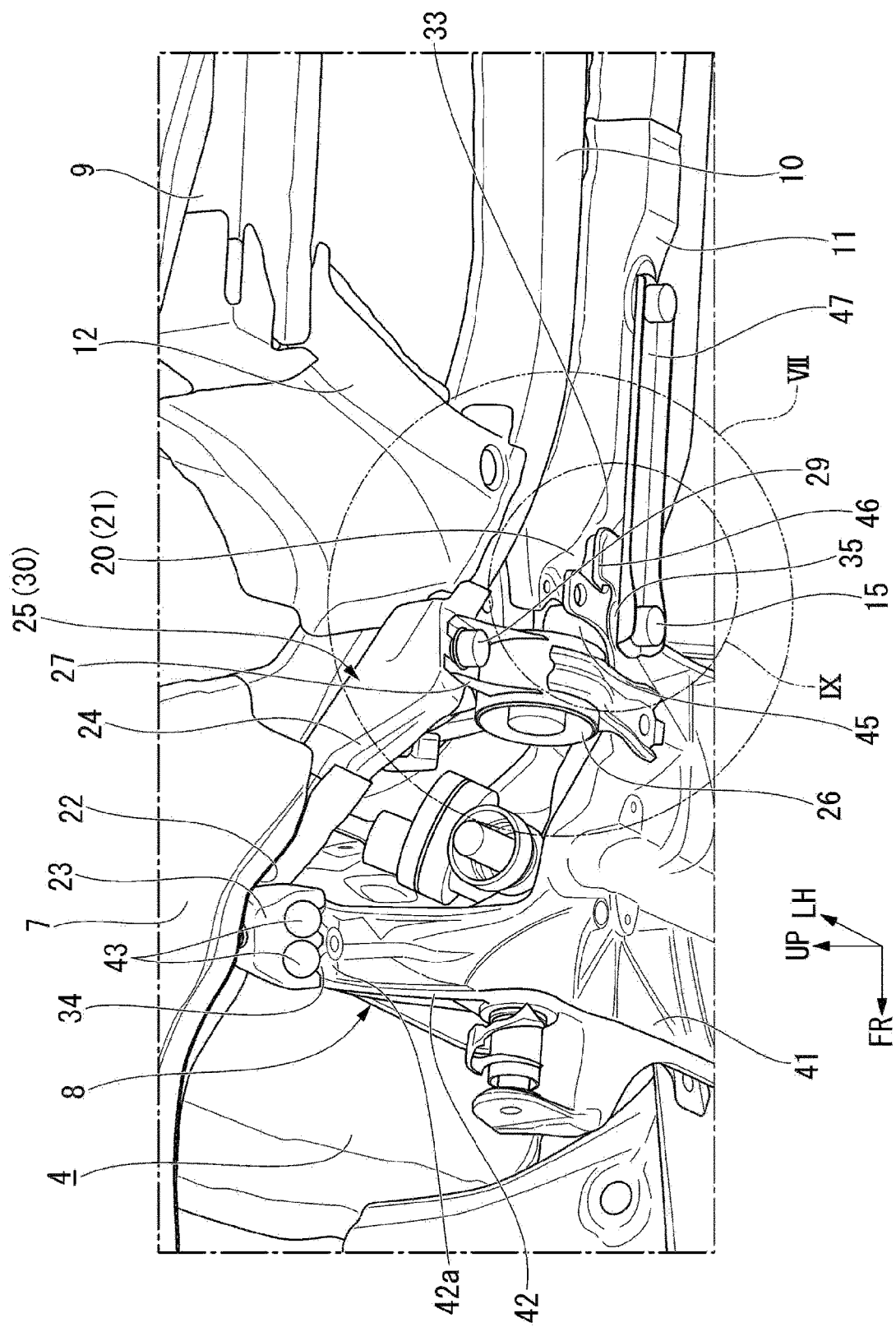
FIG. 4 is a perspective view, corresponding to the arrow view IV of FIG. 1, of the front portion of the vehicle of the embodiment.

FIG. 4 is a perspective view, corresponding to the arrow view IV of FIG. 1, of the front portion of the vehicle 1. Side sills 9 (see FIG. 4), which are skeleton members extending along the vehicle body front-rear direction, are arranged at the lower ends on both the left and right sides of the vehicle compartment 2. Floor frames 10 extending substantially along the vehicle front-rear direction are arranged on the inner side of the left and right side sills 9 in the vehicle width direction. Further, as shown in FIG. 3, tunnel frames 11 extending substantially along the vehicle front-rear direction are arranged between the left and right floor frames 10 and the central floor tunnel portion 6. Both the floor frame 10 and the tunnel frame 11 are formed in a hat-shaped cross-sectional shape that opens to the upper side, and the floor panel 3 is joined to the upper surfaces thereof. The floor frame 10 and the tunnel frame 11 form a closed cross section extending substantially along the vehicle front-rear direction with the floor panel 3.

As shown in FIG. 4, the front end portion of each of the left and right side sills 9 and the front region of the adjacent floor frame 10 are connected to each other by an outrigger 12 having a closed cross-section structure. Further, the front end portion of the floor frame 10 is further curved and extends forward and upward from the portion connecting with the outrigger 12, and is connected to the rear portion of the corresponding front side frame 7 on the left and right. Therefore, the rear portions of the left and right front side frames 7 are continuous with the corresponding floor frames 10 below the vehicle compartment 2.

Figure 5:
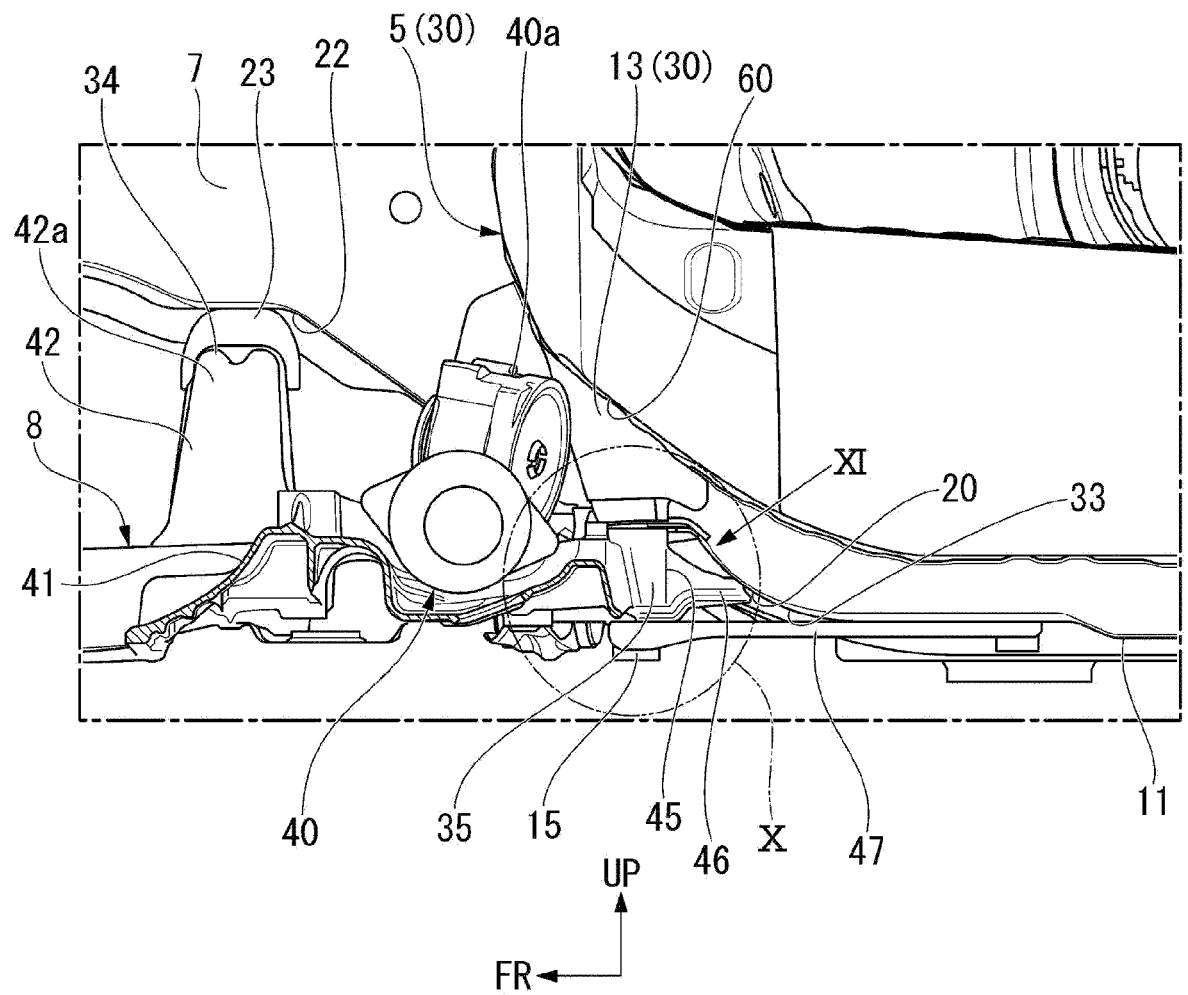
FIG. 5 is a partial cross-sectional side view of the front portion of the vehicle corresponding to the cross section V-V of FIG. 3 of the embodiment.
Figure 6:
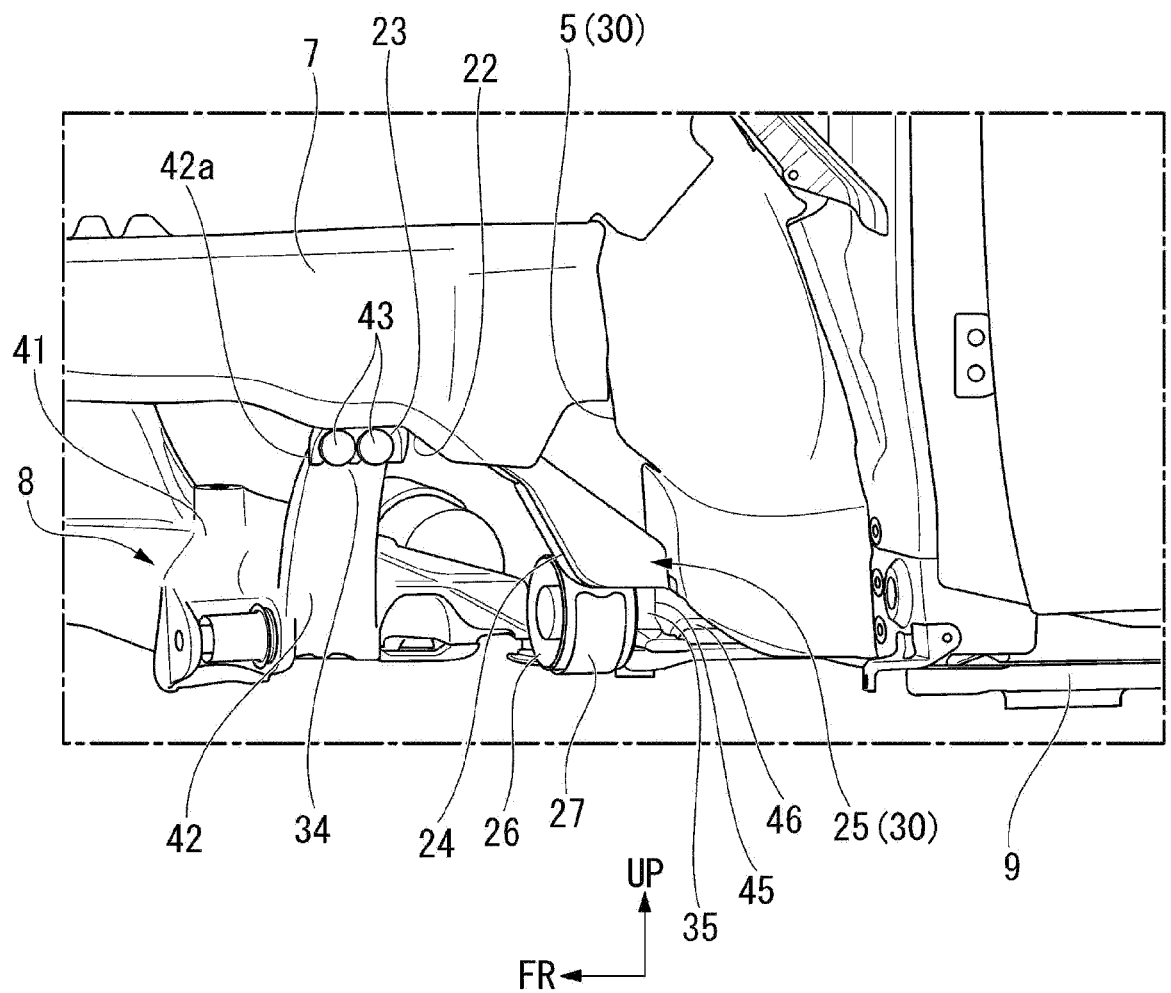
FIG. 6 is a left side view of the front portion of the vehicle of the embodiment.
Figure 7:
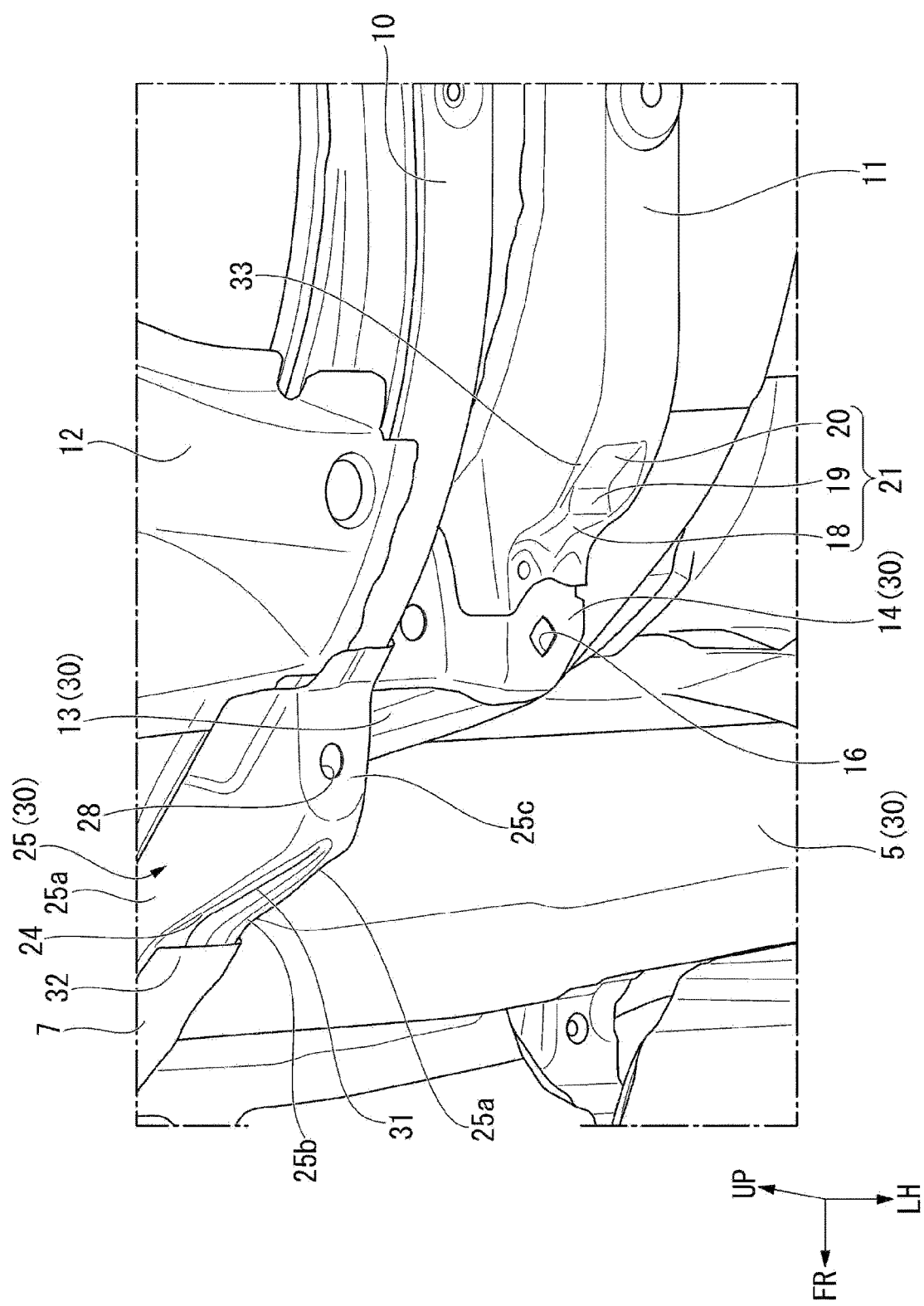
FIG. 7 is an enlarged view of the part VII of FIG. 4 of the front portion of the vehicle of the embodiment with some components removed.
Figure 8:
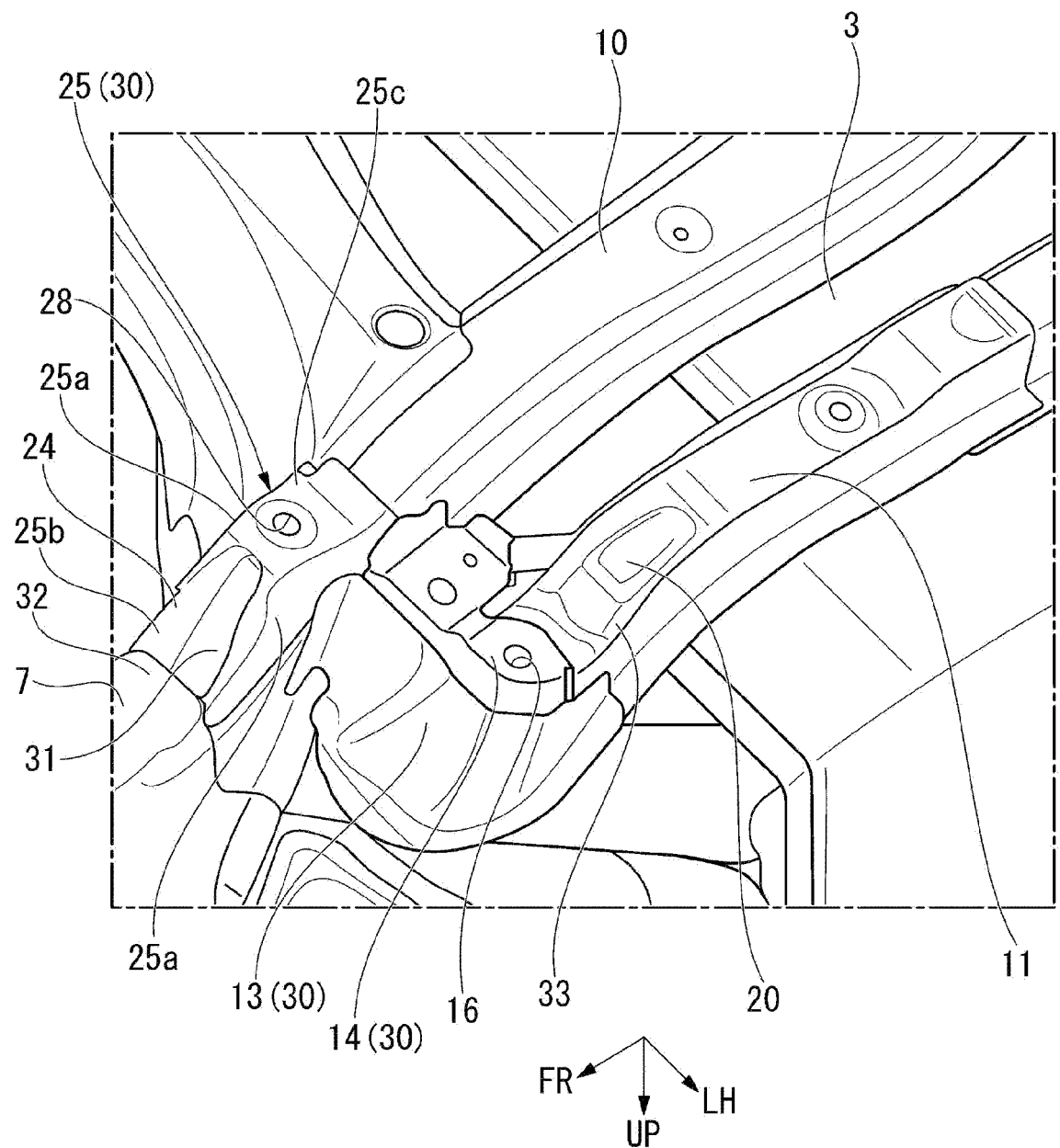
FIG. 8 is a perspective view of viewing substantially the same portion as FIG. 7 of the front portion of the vehicle of the embodiment from another angle.

FIG. 5 is a partial cross-sectional side view of the front portion of the vehicle 1 corresponding to the cross section V-V of FIG. 3, and FIG. 6 is a left side view of the front portion of the vehicle 1. Further, FIG. 7 is an enlarged view of the part VII of FIG. 4 of the front portion of the vehicle 1 with some components removed, and FIG. 8 is a perspective view of viewing substantially the same portion as FIG. 7 of the front portion of the vehicle 1 from another angle. As shown in FIG. 7 and FIG. 8, the front region of the floor frame 10 and the front end portion of the adjacent tunnel frame 11 are connected to each other via a mount bracket 13. The mount bracket 13 is joined to the lower surface of the lower region of the rising portion of the dash lower panel 5 and forms a closed cross section with the dash lower panel 5. The end portion of the mount bracket 13 on the side of the tunnel frame 11 is joined to the tunnel frame 11 so as to surround the peripheral region of the front end portion of the tunnel frame 11 and a part of the lower surface. An opening 50 (see FIG. 11) is formed on the lower surface of the mount bracket 13. A support plate 14 is attached to the mount bracket 13 so as to close the opening 50 on the lower surface. The support plate 14 is formed of a metal plate having a smaller wall thickness than the mount bracket 13. A bolt insertion hole 16 is formed in the support plate 14 at a position facing the front side region of the tunnel frame 11. A bolt 15 (see FIG. 3 to FIG. 5) for fixing a rear fastening portion 35 (to be described later) of the subframe 8 is inserted into the bolt insertion hole 16 from below. A fixing nut 17 (see FIG. 10 and FIG. 11) into which the shaft portion of the bolt 15 inserted into the bolt insertion hole 16 is screwed is attached to the upper surface side of the support plate 14. Since the support plate 14 is a thin plate made of metal, when an impact load of a predetermined value or more is input from the rear fastening portion 35 of the subframe 8 through the bolt 15, the peripheral edge portion of the fixing nut 17 may break. As a result, the rear fastening portion 35 is allowed to be detached (dropped) from the mount bracket 13 (vehicle compartment front structure body 30).

Furthermore, the front edge portion of the tunnel frame 11 is stacked and joined to the rear edge portion of the mount bracket 13. As shown in FIG. 7, at the front edge portion of the tunnel frame 11, a front wall 18 extending downward while slightly inclining to the rear side from the rear portion of the portion overlapped with the lower surface of the mount bracket 13, a substantially horizontal wall 19 extending from the lower end of the front wall 18 to the vehicle rear side, and an inclined wall 20 inclining downward from the rear end of the substantially horizontal wall 19 toward the vehicle rear side are continuously formed. The front wall 18, the substantially horizontal wall 19, and the inclined wall 20 constitute a step portion 21 at the front edge portion of the tunnel frame 11. The entire front surface of the step portion 21 inclines downward toward the vehicle rear side. The inclined portion on the front surface of the step portion 21 constitutes an inclined guide portion 33 (first inclined guide portion). The inclined guide portion 33 is arranged on a track in which the rear fastening portion 35 of the subframe 8 is displaced rearward when an impact load is input from the front of the vehicle. Further, the inclined wall 20 of the step portion 21 constitutes a fall restricting wall (to be described later).

As shown in FIG. 5 and FIG. 6, each of the left and right front side frames 7 has a narrower vertical width on the rear end side than the vertical width on the front end side. On the lower surface near the rear portion of each front side frame 7, there is a portion where the height of the lower surface is stepped high (the vertical width narrows in a stepped manner) with respect to the substantially horizontal upper surface. The portion stepped high (the root of the portion where the vertical width narrows in a stepped manner) is a bending starting point 22 where the front side frame 7 receives a load and bends and deforms when an impact load is input from the front of the vehicle. When the front side frame 7 receives an impact load from the front side thereof, the front side frame 7 bends and deforms so that the front side of the bending starting point 22 is lifted upward with the bending starting point 22 as the center (see FIG. 17 and FIG. 18). Further, a mounting bracket 23 (subframe mounting portion) to which a front fastening portion 34 (to be described later) of the subframe 8 is fastened is fixed at the front side position of the bending starting point 22 on the lower surface of each front side frame 7.

In addition, a component mounting bracket 25 having an inclined guide portion 24 (third inclined guide portion) is integrally coupled at the position rearward and downward of the bending start point 22 of each front side frame 7. As shown in FIG. 7 and FIG. 8, the component mounting bracket 25 has a pair of side walls 25a having a substantially triangular shape in the side view, a front wall 25b connecting the front end portions of the pair of side walls 25a, and a lower wall 25c connecting the lower end portions of the pair of side walls 25a, and the front surface side of the front wall 25b is the inclined guide portion 24. The front surface of the inclined guide portion 24 inclines downward toward the vehicle rear side. The component mounting bracket 25 is stacked so as to cover the front edge portion of the corresponding floor frame 10 on the left and right from below, and is joined to the front edge portion of the floor frame 10 in this state.

The inclined guide portion 24 (front wall 25b) of the component mounting bracket 25 is formed with a recessed portion 31 extending in the vertical direction. The recessed portion 31 extends from the front surface of the front wall 25b of the component mounting bracket 25 to the front end portion of the lower surface of the lower wall 25c. Further, a rear end joint portion 32 joined to the front surface of the inclined guide portion 24 (front wall 25b) of the component mounting bracket 25 extends on the lower wall on the rear portion side of each front side frame 7. The rear end joint portion 32 is joined to the front surface of the inclined guide portion 24 (front wall 25b) so as to be continuous with the upper end portion (the portion starting to be recessed rearward and downward) of the recessed portion 31.

One end portion of a mount holding plate 27 that holds a support mount 26 (see FIG. 4) of a suspension arm is fastened and fixed to the lower wall of the component mounting bracket 25. Reference numeral 28 in FIG. 7 and FIG. 8 is a bolt insertion hole through which a bolt 29 (see FIG. 4) for fixing the mount holding plate 27 to the component mounting bracket 25 is inserted. The other end portion of the mount holding plate 27 is bolted to the lower surface near the rear portion of the subframe 8. The support mount 26 is fixed to the component mounting bracket 25 and the subframe 8 so as to be sandwiched from above and below by a holding plate on the upper side (not shown) and the mount holding plate 27. The component mounting bracket 25 is formed of an aluminum casting similar to the subframe 8 or a member having a rigidity equivalent to that of the aluminum casting.

The subframe 8 includes a subframe body 41 having a substantially rectangular shape in the plan view to which the steering gear box 40 (mounted component) is attached on the upper surface on the rear portion side, a pair of leg portions 42 (third convex portions) protruding upward from the left and right front regions of the subframe body 41, the front fastening portions 34 provided on top portions 42a of the leg portions 42 and fastened to the corresponding front side frames 7 on the left and right, and the rear fastening portions 35 arranged in the left and right rear regions of the subframe body 41 and fastened to the lower ends (support plate 14) of the left and right mount brackets 13 described above. In the present embodiment, the mount bracket 13, the support plate 14, the component mounting bracket 25, the dash lower panel 5, etc. constitute the vehicle compartment front structure body 30 arranged in the front portion of the vehicle compartment 2.

The front fastening portion 34 is configured with a fixing nut (not shown) provided on a side surface of the top portion 42a on the outer side in the vehicle width direction as a main element. The front fastening portion 34 is fastened and fixed to the mounting bracket 23 (subframe mounting portion) of the corresponding front side frame 7 on the left and right by a bolt 43 (see FIG. 4 and FIG. 6). The mounting bracket 23 is formed with a slit 44 (see FIG. 13) that opens downward in a fastening wall that is overlapped with the side wall of the top portion 42a. The bolt 43 is fastened to the fixing nut of the front fastening portion 34 with the shaft portion in a horizontal posture in a state where the shaft portion is inserted through the slit 44. As a result, the front fastening portion 34 of the subframe 8 is fastened and fixed to the corresponding front side frame 7 on the left and right. However, since the fastening wall of the mounting bracket 23 is formed with the slit 44 that opens downward, when an excessive downward relative load acts on the shaft portion of the bolt 43 through the leg portion 42 of the subframe 8, the shaft portion of the bolt 43 slips through the slit 44 and falls downward together with the leg portion 42.

The inclined guide portion 24 of the component mounting bracket 25 described above is arranged on a track in which the top portion 42a of the leg portion 42 detached from the front side frame 7 is displaced rearward when an impact load is input from the rear of the vehicle. Further, as shown in FIG. 3, the component mounting bracket 25 is arranged so as to be aligned with the top portion 42a of the corresponding leg portion 42 on the left and right of the subframe 8 in the vehicle front-rear direction.

Figure 9:
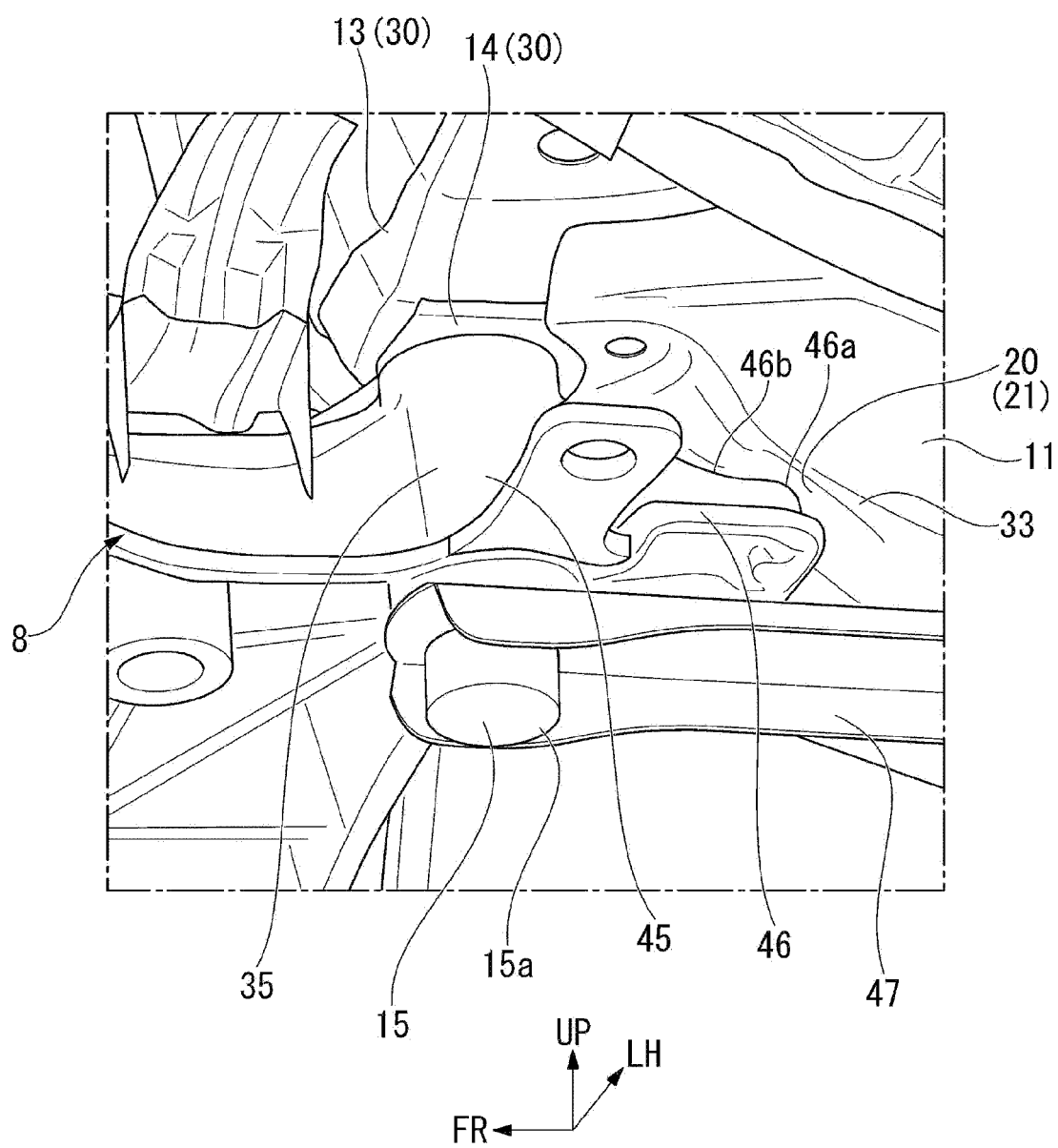
FIG. 9 is an enlarged view of the part IX of FIG. 4 of the front portion of the vehicle of the embodiment with some components removed.
Figure 10:
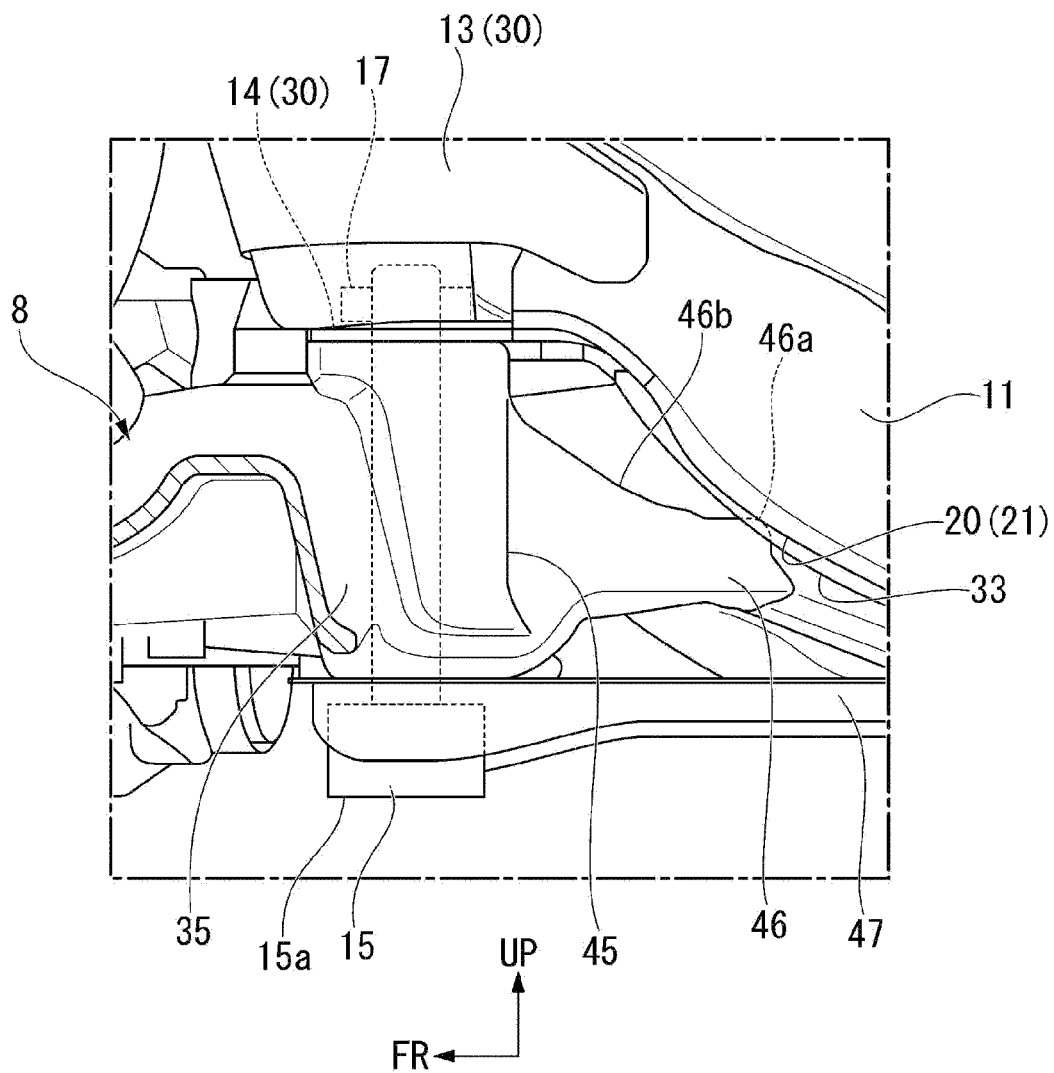
FIG. 10 is an enlarged view of the part X of FIG. 5 of the vehicle of the embodiment.

FIG. 9 is an enlarged view of the part IX of FIG. 4 with some components removed, and FIG. 10 is an enlarged view of the part X of FIG. 5. As shown in these drawings, the rear fastening portion 35 of the subframe 8 includes a tubular body 45 through which the bolt 15 penetrates in the vertical direction, and a convex portion 46 (first convex portion) protruding from the tubular body toward the vehicle rear side. The rear fastening portion 35 is fixed to the lower end of the mount bracket 13 by the bolt 15 penetrating the support plate 14 at the lower end of the mount bracket 13 and being fastened to the fixing nut 17. In this state, the tip portion of the convex portion 46 directed toward the vehicle rear side faces the inclined guide portion 33 in the front portion of the tunnel frame 11.

The inclined wall 20 of the inclined guide portion 33 faces the convex portion 46 from the vehicle rear side at the position rearward of the fastening portion (fixing nut 17) of the support plate 14. The inclined wall 20 constitutes a fall restricting wall against which the convex portion 46 is pressed from the front when an impact load is input from the front of the vehicle. When an impact load is input, the convex portion 46 is pressed against the front surface of the rear fastening portion 35, so that the falling of the tubular body 45 in the direction in which the tip portion of the convex portion 46 is lifted upward is restricted. The inclined wall 20 constitutes the fall restricting wall that restricts the falling of the tubular body 45.

As shown in FIG. 9 and FIG. 10, the convex portion 46 of the rear fastening portion 35 includes a contact surface 46a that comes into contact with the inclined wall 20 which is the fall restricting wall when an impact load is input from the front of the vehicle, and an upper inclined surface 46b that inclines downward from the upper region of the tubular body 45 toward the vehicle rear side and connects the upper region and the contact surface 46a.

Further, as shown in FIG. 9 and FIG. 10, one end portion of a long hinge plate 47 having a U-shaped cross section is fastened and fixed between the lower surface of the tubular body 45 of the rear fastening portion 35 and a head portion 15a of the bolt 15. The other end portion of the hinge plate 47 is fixed to the lower surface near the front portion of the tunnel frame 11. The hinge plate 47 controls the falling behavior of the subframe 8 when the subframe 8 falls at the time of input of an impact load from the vehicle front side.

Figure 11:
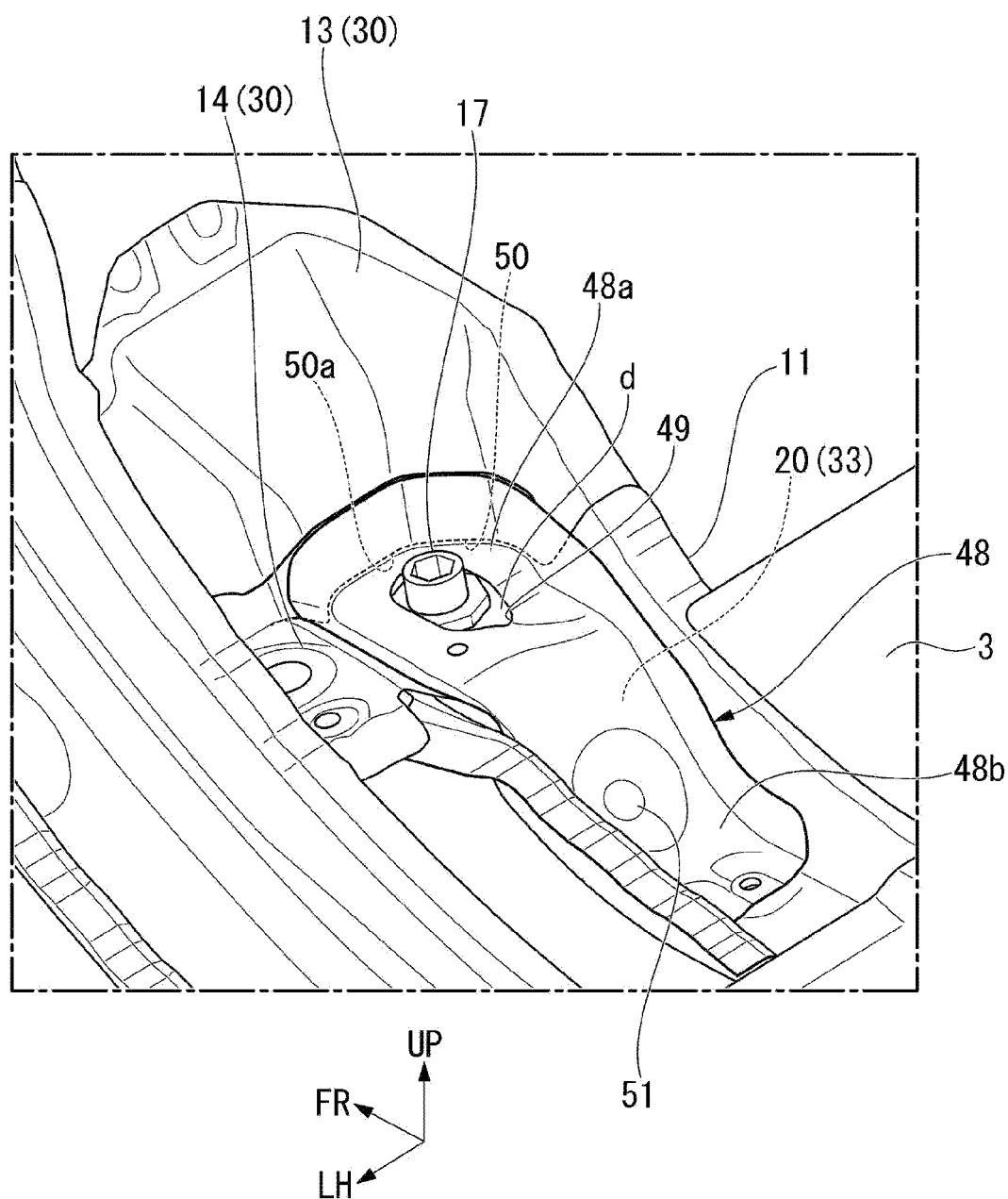
FIG. 11 is a perspective view, corresponding to the arrow view XI of FIG. 5, of the front portion of the vehicle of the embodiment.

FIG. 11 is a perspective view corresponding to the arrow view XI of FIG. 5. As shown in FIG. 11, a highly rigid reinforcing plate 48 (reinforcing member) is attached to the rear surface side of the inclined wall 20 (fall restricting wall) in the front portion of the tunnel frame 11. The reinforcing plate 48 has an upper joint portion 48a joined to the upper surface of the support plate 14, and an inclined portion joint portion 48b that includes downward from the rear portion of the upper joint portion 48a toward the vehicle rear side and is joined to the rear surface of the tunnel frame 11.

The upper joint portion 48a is formed with an elongated hole 49 that surrounds the fixing nut 17 fixed to the upper surface of the support plate 14 and has a gap d between the upper joint portion 48a and the rear portion of the fixing nut 17. The support plate 14 is joined to the edge portion of the opening 50 at the lower end of the mount bracket 13. The fixing nut 17 fixed on the support plate 14 is arranged close to an edge portion 50a on the front side of the opening 50.

The inclined portion joint portion 48b of the reinforcing plate 48 is formed with a reinforcing convex portion 51 that bulges toward the vehicle front side at a position rearward of the inclined wall 20 (fall restricting wall) with which the contact surface 46a of the convex portion 46 comes into contact when an impact load is input from the front of the vehicle. The reinforcing convex portion 51 supports the inclined wall 20 from the rear side when the convex portion 46 of the rear fastening portion 35 is pressed against the front surface side of the inclined wall 20 at the time of input of an impact load from the front of the vehicle.

In addition, as shown in FIG. 2 and FIG. 5, the steering gear box 40 mounted on the upper surface on the rear portion side of the subframe 8 has an assist motor 40a (second convex portion) arranged at a portion slightly to the right of the center in the vehicle width direction. The motor 40a has a relatively large outer diameter, and as shown in FIG. 2, the motor 40a bulges to the rearmost upper side in the steering gear box 40. The front surface of an inclined guide portion 60 (second inclined guide portion) of the dash lower panel 5 faces the rear side of the motor 40a. The front surface of the inclined guide portion 60 inclines downward toward the vehicle rear side, and when an impact load is input from the front of the vehicle, the motor 40a comes into contact with the front surface along with the rearward displacement of the subframe 8. Further, as shown in FIG. 2, a dash cross member 55 extending along the vehicle width direction is arranged on the rear surface of the dash lower panel 5. The dash cross member 55 is joined to the rear surface position of the inclined guide portion 60 on the rear surface of the dash lower panel 5.

Here, a case of the motor 40a is formed of a material having higher rigidity than an aluminum casting such as a steel material. That is, the case of the motor 40a has higher rigidity than the leg portions 42 of the subframe 8 made of an aluminum casting. The front surface of the inclined guide portion 60 of the dash lower panel 5 with which the motor 40a comes into contact when an impact load is input from the front of the vehicle is set to a gentle downward inclination angle compared with the front surface of the inclined guide portion 24 of the component mounting bracket 25 with which the top portion 42a of the leg portion 42 comes into contact.

In addition, the front surface of the inclined guide portion 60 of the dash lower panel 5 is arranged to face the rear side of the motor 40a, and the front surface of the inclined wall 20 in the front portion of the tunnel frame 11 is arranged to face the rear side of the rear fastening portion 35 of the subframe 8. The separation distance between the rear fastening portion 35 and the inclined wall 20 is set shorter than the separation distance between the motor 40a and the inclined guide portion 60. Further, the separation distance between the top portion 42a of the leg portion 42 of the subframe 8 and the inclined guide portion 24 of the component mounting bracket 25 is set longer than the separation distance between the motor 40a and the inclined guide portion 60. Therefore, when an impact load is input from the front of the vehicle, the rear fastening portion 35 comes into contact with the inclined wall 20 first, and then the motor 40a comes into contact with the inclined guide portion 60, and thereafter the top portion 42a of the leg portion 42 comes into contact with the inclined guide portion 24.

Figure 12:
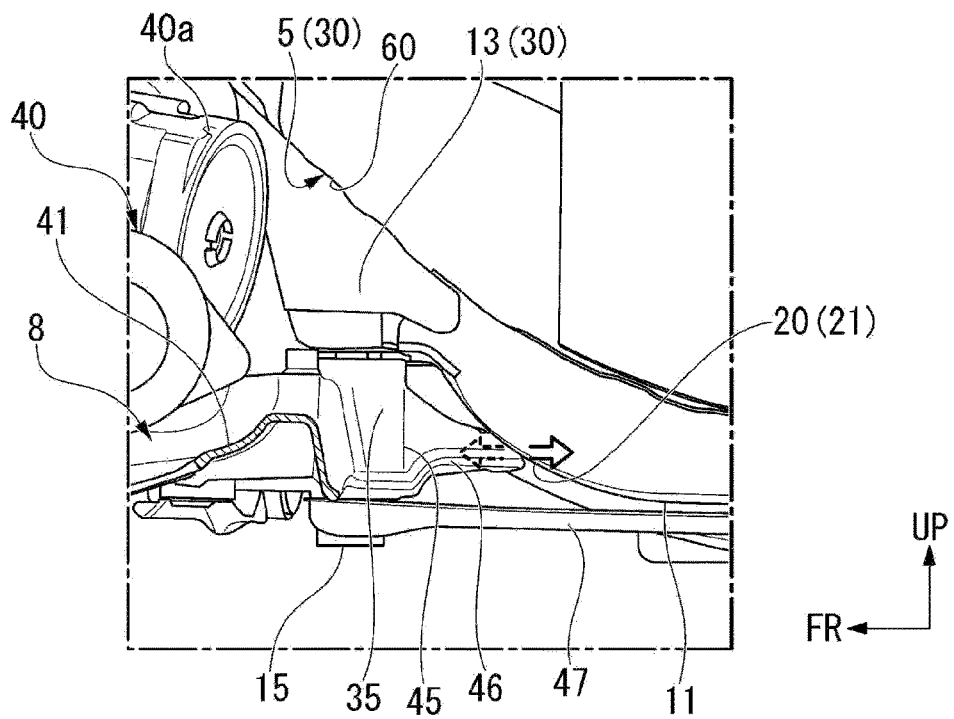
FIG. 12 is a partial cross-sectional side view similar to FIG. 6 showing the deformation behavior of the front portion of the vehicle of the embodiment.

Subsequently, an example of the deformation behavior of the front portion of the vehicle 1 when an impact load is input from the front surface of the vehicle 1 will be described with reference to FIG. 12 to FIG. 18. When an impact load is input from the front surface of the vehicle 1, the subframe 8 is pressed toward the vehicle rear side along with the rearward displacement of the power unit such as the engine, and as shown in FIG. 12, the convex portion 46 of the rear fastening portion 35 of the subframe 8 is pressed against the inclined wall 20 in the front portion of the tunnel frame 11. As a result, the convex portion 46 receives a reaction force from the inclined wall 20, and the falling deformation in which the tubular body 45 of the rear fastening portion 35 is lifted upward is restricted. As a result, out-of-plane deformation of the support plate 14 to which the bolt 15 is fastened is suppressed. When the subframe 8 is further pressed toward the vehicle rear side in this state, the support plate 14 starts to break, and the convex portion 46 of the rear fastening portion 35 is guided rearward and downward along the inclined wall 20.

Figure 13:
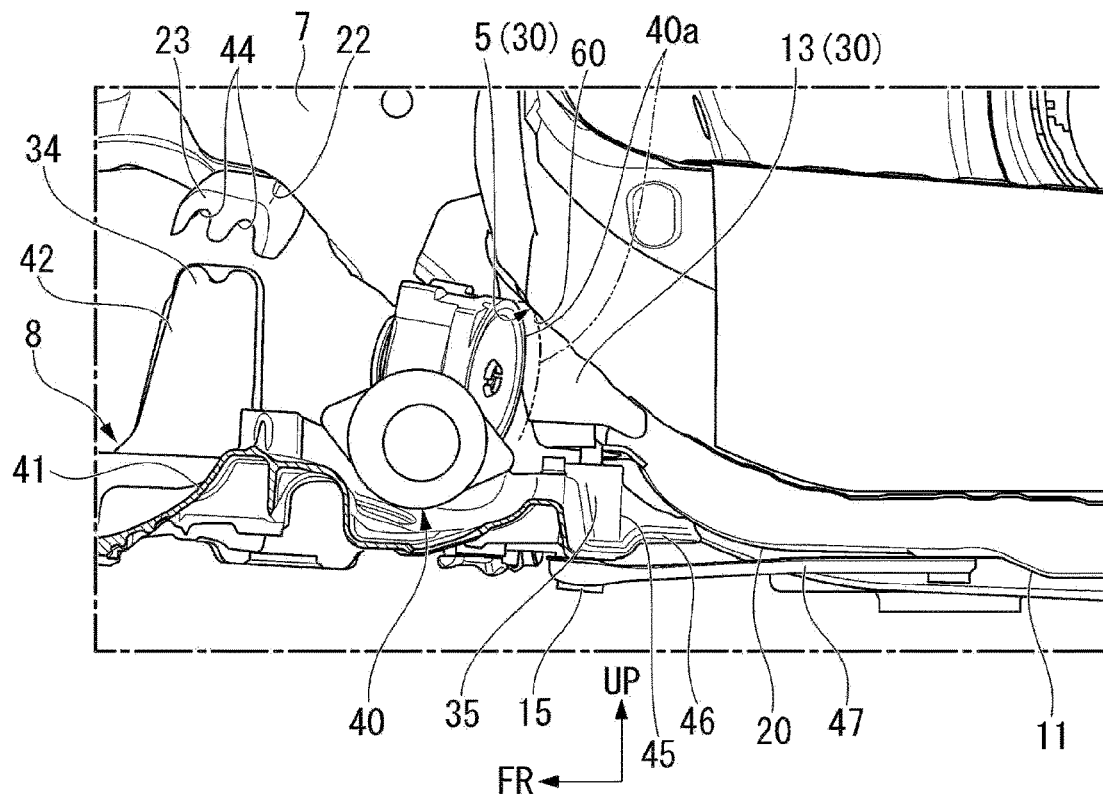
FIG. 13 is a partial cross-sectional side view similar to FIG. 6 showing the deformation behavior of the front portion of the vehicle of the embodiment.

On the other hand, when an impact load is input from the front surface to the front portion of the front side frame 7, as shown in FIG. 13, with the bending starting point 22 near the rear portion as the starting point, the front side frame 7 starts to bend and deform so that the front portion of the bending starting point 22 is lifted upward. As a result, the mounting bracket 23 (subframe mounting portion) of the front side frame 7 is lifted upward, while the subframe 8 continues to be pressed toward the vehicle rear side. As a result, the bolt 43 of the front fastening portion 34 is detached downward from the slit 44 of the mounting bracket 23, and the leg portion 42 of the subframe 8 falls downward from the front side frame 7.

Figure 14:
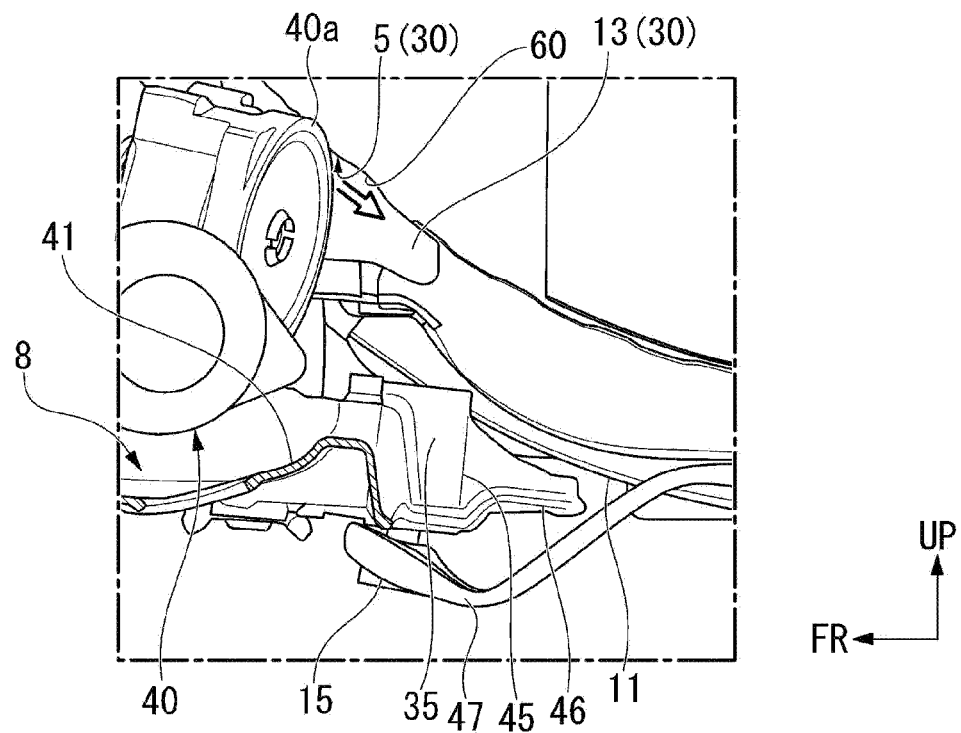
FIG. 14 is a partial cross-sectional side view similar to FIG. 6 showing the deformation behavior of the front portion of the vehicle of the embodiment.
Figure 15:
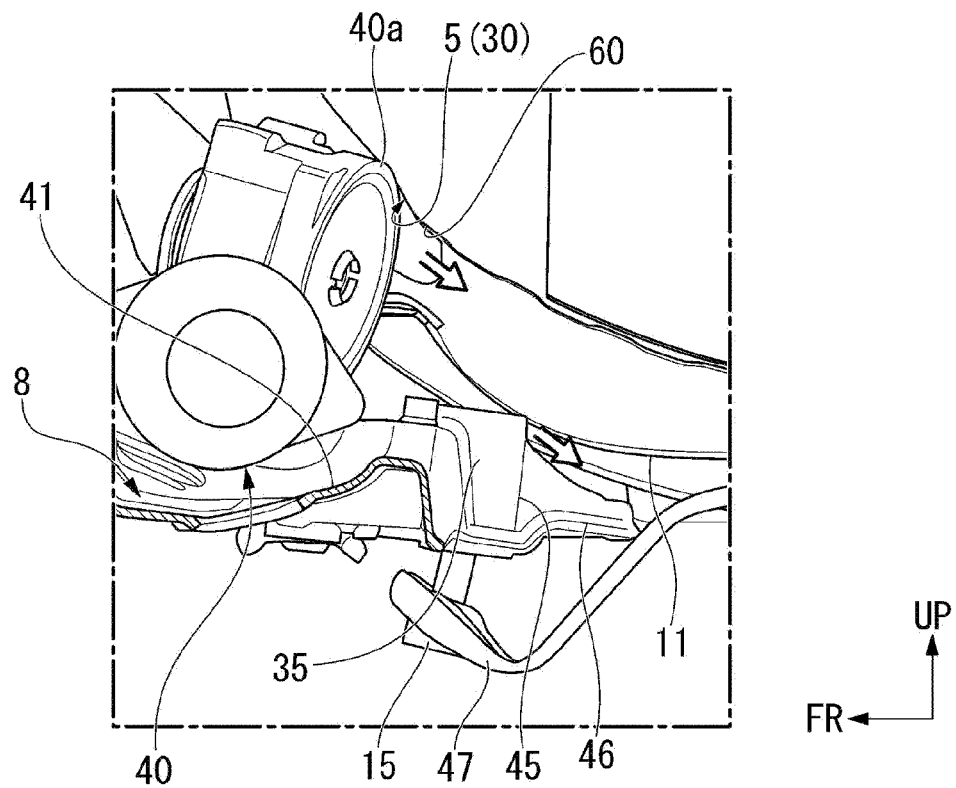
FIG. 15 is a partial cross-sectional side view similar to FIG. 6 showing the deformation behavior of the front portion of the vehicle of the embodiment.
Figure 16:
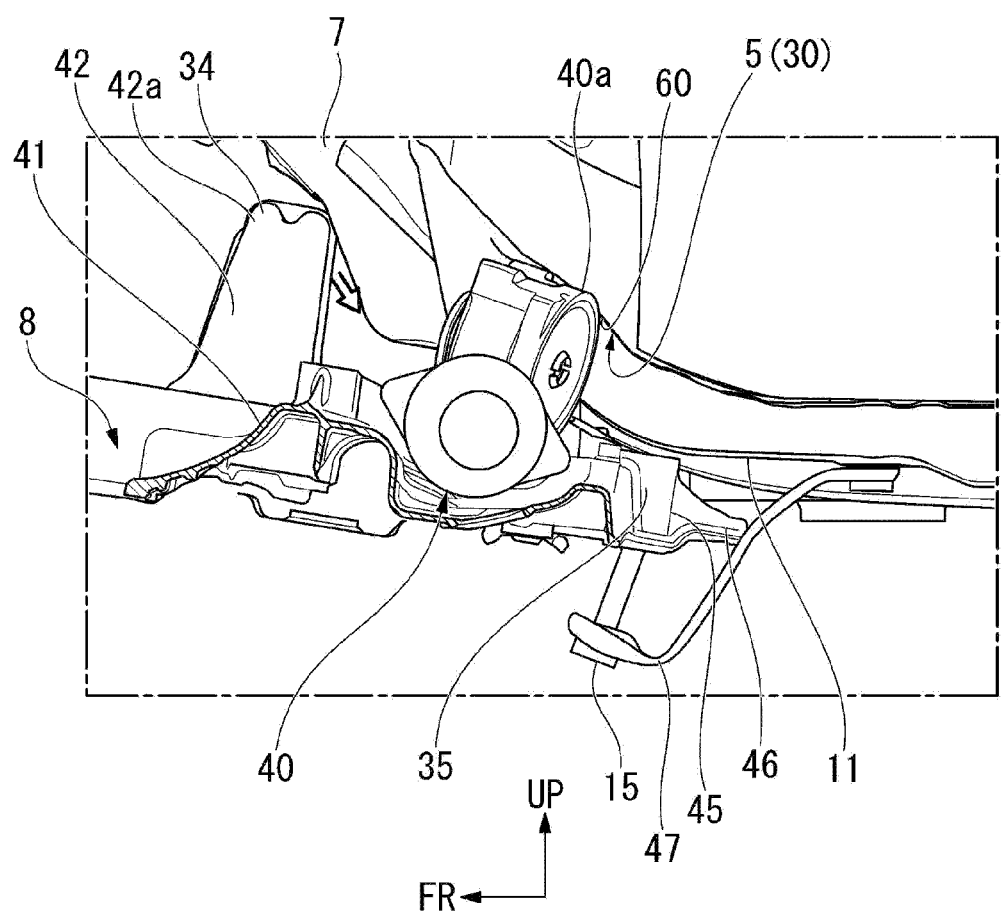
FIG. 16 is a partial cross-sectional side view similar to FIG. 6 showing the deformation behavior of the front portion of the vehicle of the embodiment.

Moreover, when the input of the impact load continues, as shown in FIG. 14, the front fastening portion is completely detached from the mount bracket 13 together with the bolt 15 due to the breakage of the support plate 14, and the motor 40a on the subframe 8 comes into contact with the inclined guide portion 60 of the dash lower panel 5. As a result, the motor 40a is guided rearward and downward along the inclined guide portion 60. Further, as shown in FIG. 15, before and after the contact between the motor 40a and the inclined guide portion 60, the tubular body 45 of the rear fastening portion 35 comes into contact with the inclined wall 20, and the tubular body 45 is guided rearward and downward along the inclined wall 20.

Figure 17:
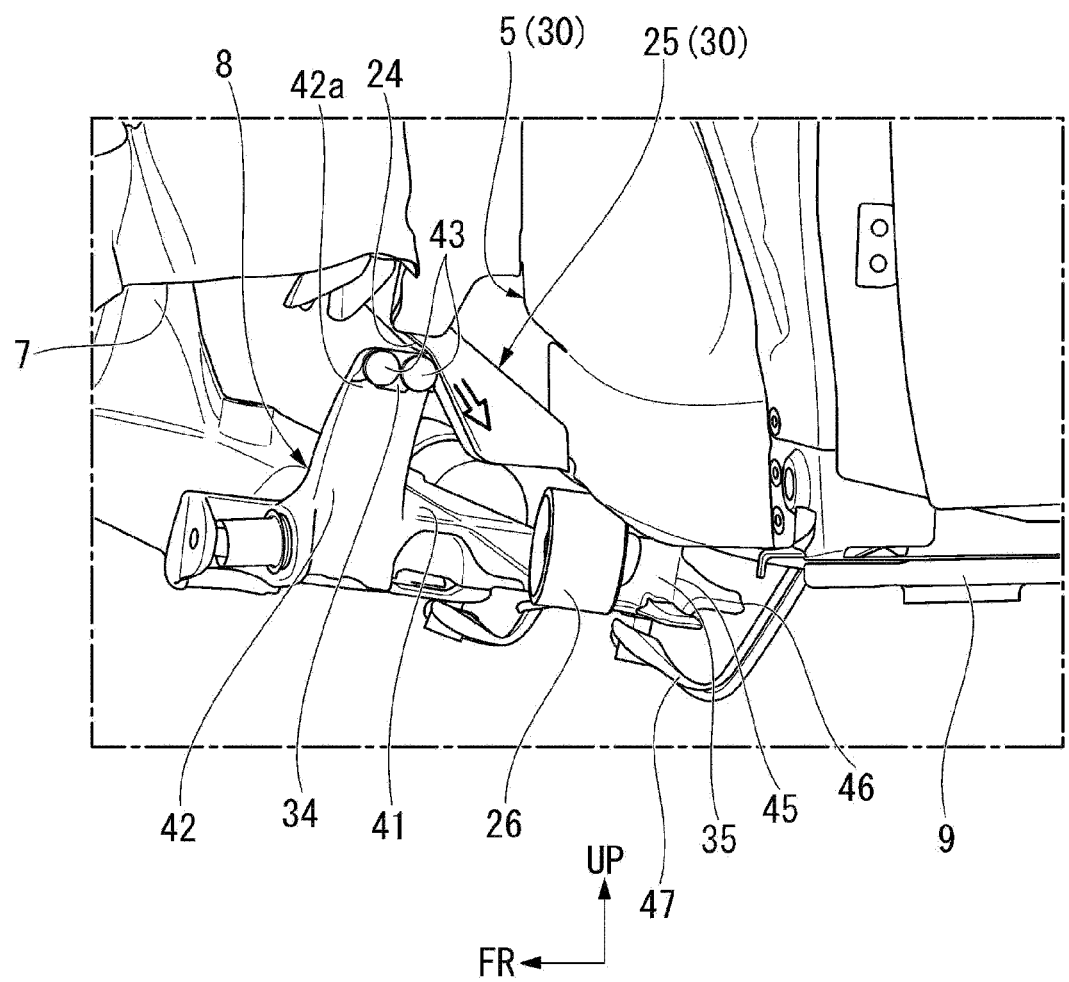
FIG. 17 is a partial cross-sectional side view similar to FIG. 6 showing the deformation behavior of the front portion of the vehicle of the embodiment.
Figure 18:
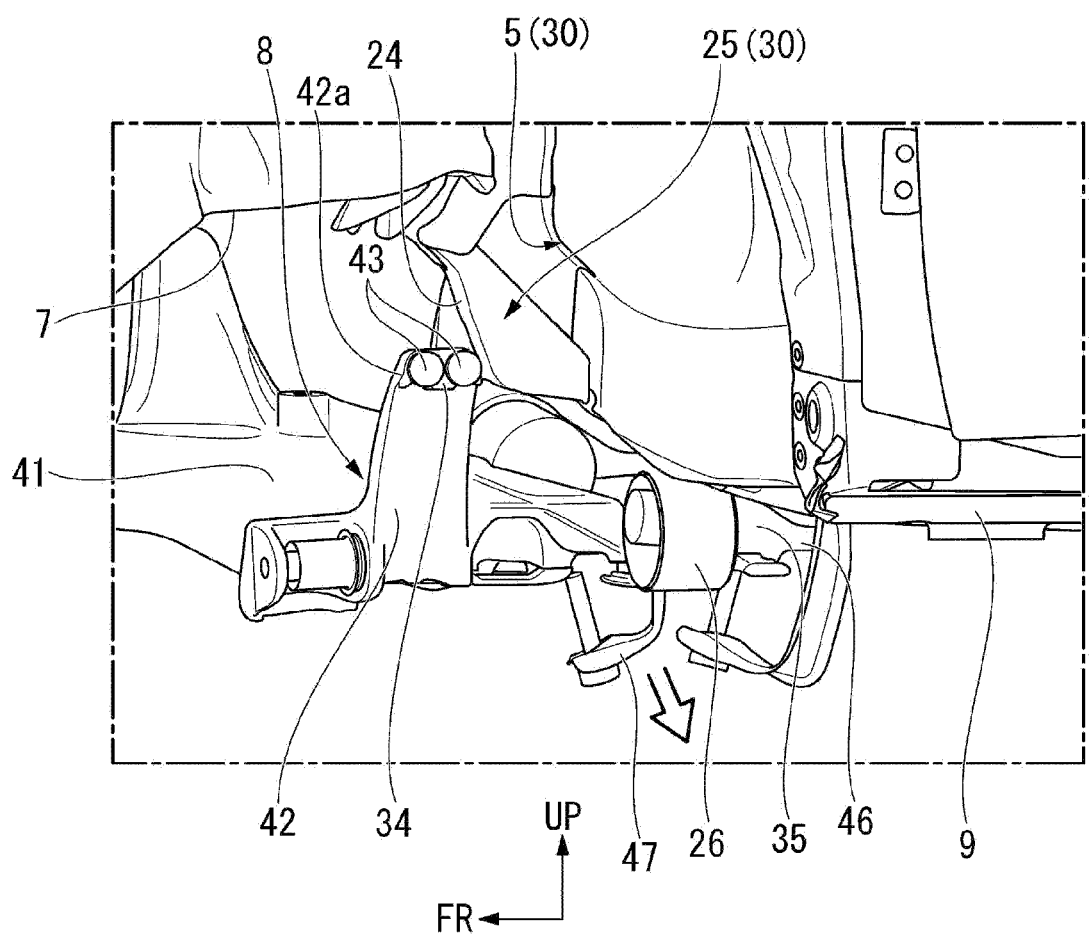
FIG. 18 is a partial cross-sectional side view similar to FIG. 6 showing the deformation behavior of the front portion of the vehicle of the embodiment.

Thereafter, when the input of the impact load further continues, the entire subframe 8 is displaced rearward while inclining rearward, and as shown in FIG. 17, the top portion 42a of the leg portion 42 of the subframe 8 comes into contact with the inclined guide portion 24 of the component mounting bracket 25. As a result, the top portion 42a of the leg portion 42 is guided rearward and downward along the slope of the inclined guide portion 24. In this way, when the guidance of the leg portion 42 performed by the inclined guide portion 24 is completed, the entire subframe 8 falls below the dash lower panel 5 as shown in FIG. 18.

As described above, the front structure of the vehicle body according to the present embodiment has the inclined guide portion 33 (first inclined guide portion), the inclined guide portion 60 (second inclined guide portion), and the inclined guide portion 24 (third inclined guide portion) provided in the vehicle compartment front structure body 30 so as to correspond to the convex portion 46 (first convex portion), the motor 40a (second convex portion), and the leg portion 42 (third convex portion) arranged dispersedly on the subframe 8. Then, when an impact load is input from the front of the vehicle, the convex portion 46, the motor 40a, and the leg portion 42 on the subframe 8 respectively come into contact with the front surfaces of the inclined guide portions 33, 60, and 24 to be guided downward. Therefore, when the front structure of the vehicle body according to the present embodiment is adopted, even if the subframe 8 including the mounted components has a complicated three-dimensional shape as a whole, the subframe 8 can be smoothly dropped downward on the front side of the vehicle compartment when an impact load is input from the front of the vehicle.

Further, in the front structure of the vehicle body according to the present embodiment, the rigidity of the case of the motor 40a is higher than the rigidity of the leg portion 42 of the subframe 8, and the inclination angle (downward inclination angle) of the front surface of the inclined guide portion 60 that comes into contact with the motor 40a when an impact load is input is gentler than the inclination angle (downward inclination angle) of the front surface of the inclined guide portion 24 that comes into contact with the leg portion 42. Therefore, it is possible to suppress the indentation deformation of the inclined guide portion due to the highly rigid motor 40a coming into contact with the inclined guide portion having a steep inclination angle. Accordingly, when this configuration is adopted, the motor 40a and the leg portion 42 can be smoothly slid on the corresponding inclined guide portions, and the subframe 8 can be stably dropped downward. When the rigidity of the leg portion 42 is higher than the rigidity of the motor 40a, it is desirable that the inclination angle of the inclined guide portion 24 that comes into contact with the leg portion 42 is gentler than the inclination angle of the inclined guide portion 60 that comes into contact with the motor 40a.

Further, in the front structure of the vehicle body according to the present embodiment, the inclined guide portion 24 is provided at the front end portion of the tunnel frame 11 so as to face the convex portion 46 of the subframe 8 from the rear side, and the inclined guide portion 60 is provided on the dash lower panel 5 so as to face the motor 40a from the rear side. Then, the separation distance between the convex portion 46 of the subframe 8 and the inclined guide portion 24 is set shorter than the separation distance between the motor 40a and the inclined guide portion 60. Therefore, when an impact load is input from the front of the vehicle, first the convex portion 46 of the rear fastening portion 34 of the subframe 8 comes into contact with the front surface of the inclined guide portion 24 at the front end portion of the tunnel frame, and the rear fastening portion is guided downward. Subsequently, the motor 40a on the subframe 8 comes into contact with the front surface of the inclined guide portion 60 of the dash lower panel 5, and the motor 40a is guided downward together with the subframe 8. At this time, since the motor 40a comes into contact with the front surface of the inclined guide portion 60 of the dash lower panel 5 in a situation where the rear portion side of the subframe 8 is being guided downward, the event that the motor 40a is prevented from falling due to the deformation of the dash lower panel 5 does not occur.

In addition, in the front structure of the vehicle body according to the present embodiment, the mounting bracket 23 is fixed to the front side of the bending starting point 22 of the front side frame 7, the component mounting bracket 25 is coupled to the rear side of the bending starting point 22, and the inclined guide portion 24 with which the top portion 42a of the leg portion 42 comes into contact when an impact load is input is formed on the front surface side of the component mounting bracket 25. Therefore, at the time of input of an impact load from the front of the vehicle, the leg portion 42 of the subframe 8 is separated from the mounting bracket 23 when the front side frame 7 bends and deforms starting from the bending starting point 22, and the top portion 42a of the leg portion 42 comes into contact with the front surface of the inclined guide portion 24 of the component mounting bracket 25 with the rearward displacement of the subframe 8. Accordingly, when this configuration is adopted, the entire subframe 8 can be smoothly dropped downward.

Further, in the front structure of the vehicle body according to the present embodiment, since the inclined guide portion 24 of the component mounting bracket 25 is provided with the recessed portion 31 extending in the vertical direction, the strength of the inclined guide portion 24 can be increased by the recessed portion 31. Therefore, when the leg portion 42 of the subframe 8 comes into contact with the inclined guide portion 24 at the time of input of an impact load from the front of the vehicle, it is possible to suppress the guide surface of the inclined guide portion 24 from being deformed. As a result, it is possible to stably guide the leg portion 42 of the subframe 8 downward.

In addition, in the front structure of the vehicle body according to the present embodiment, the inclined guide portion 60 is formed at a portion of the dash lower panel 5 which faces the motor 40*a* on the subframe 8 from the vehicle rear side, and the dash cross member 55 extending in the vehicle width direction is joined to the rear surface side of the inclined guide portion 60. Therefore, the strength of the inclined guide portion 60 with which the motor 40*a* comes into contact when an impact load is input is increased, and when the motor 40*a* comes into contact with the front surface of the inclined guide portion 60, the guide surface of the inclined guide portion 60 is less likely to be deformed. As a result, the motor 40*a* on the subframe 8 can be stably guided downward.

Furthermore, in the front structure of the vehicle body according to the present embodiment, the rear fastening portion 33 of the subframe 8 is provided with the tubular body 45 through which the bolt 15 penetrates vertically, and the convex portion 46 protruding from the tubular body 45 toward the vehicle rear side, and the tubular body 45 is fastened to the lower surface of the support plate 14 that extends substantially horizontally by the bolt 15. Then, the inclined guide portion 33 facing the convex portion 45 of the rear fastening portion 35 from the vehicle rear side is provided on the rear side of the portion of the support plate 14 fastened by the bolt 15. Therefore, when an impact load is input from the front of the vehicle, the convex portion 45 protruding rearward from the tubular body 45 of the rear fastening portion 35 is pressed against the inclined guide portion 33. As a result, the tubular body 45 of the rear fastening portion 35 receives a reaction force through the convex portion 45, and the falling of the tubular body 45 is restricted. As a result, the out-of-plane deformation of the support plate 14 is suppressed, and the fastening portion of the support plate 14 breaks smoothly. Accordingly, when this configuration is adopted, the rear fastening portion 35 of the subframe 8 can be reliably detached at the time of input of an impact load from the front of the vehicle.

Nevertheless, the disclosure is not limited to the above embodiment, and various design changes can be made without departing from the gist thereof

What is claimed is:

1. A front structure of a vehicle body, comprising:
a pair of left and right front side frames extending to a front of a vehicle on a front side of a vehicle compartment;
a subframe erected below the pair of front side frames; and
a vehicle compartment front structure body arranged in a front portion of the vehicle compartment,
wherein the subframe comprises:
a subframe body to which a steering gear box is attached on an upper surface side;
a front fastening portion fastened to the front side frame in a front region of the subframe body; and
a rear fastening portion fastened and fixed to the vehicle compartment front structure body in a rear region of the subframe body,
wherein the rear fastening portion is provided with a first convex portion that protrudes toward a vehicle rear side,
a part of the steering gear box constitutes a second convex portion that protrudes upward from the subframe body,
the front fastening portion is provided on a third convex portion that protrudes upward from the front region of the subframe body, and
the vehicle compartment front structure body comprises:
a first inclined guide portion having a front surface which inclines downward toward a rear of the vehicle and with which the first convex portion comes into contact along with rearward displacement of the subframe when an impact load is input from the front of the vehicle;
a second inclined guide portion having a front surface which inclines downward toward the rear of the vehicle and with which the second convex portion comes into contact along with rearward displacement of the subframe when the impact load is input from the front of the vehicle; and
a third inclined guide portion having a front surface which inclines downward toward the rear of the vehicle and with which the third convex portion comes into contact along with rearward displacement of the subframe when the impact load is input from the front of the vehicle.

2. The front structure of the vehicle body according to claim 1, wherein a rigidity of one of the second convex portion and the third convex portion is higher than a rigidity of the other of the second convex portion and the third convex portion, the front surface of the second inclined guide portion which comes into contact with the second convex portion is set to a downward inclination angle, and the front surface of the third inclined guide portion which comes into contact with the third convex portion is set to a downward inclination angle,
when the rigidity of the second convex portion is higher than the rigidity of the third convex portion, the downward inclination angle of the front surface of the second inclined guide portion is gentler than the downward inclination angle of the front surface of the third inclined guide portion,
when the rigidity of the third convex portion is higher than the rigidity of the second convex portion, the downward inclination angle of the front surface of the third inclined guide portion is gentler than the downward inclination angle of the front surface of the second inclined guide portion.

3. The front structure of the vehicle body according to claim 1, wherein the vehicle compartment front structure body comprises:
a tunnel frame arranged along a vehicle front-rear direction below the vehicle compartment and extending to a position where a front end portion faces the subframe; and
a dash lower panel separating the vehicle compartment and a front compartment on a front side of the vehicle compartment,
wherein the first inclined guide portion is provided at the front end portion of the tunnel frame so as to face the first convex portion of the subframe from the vehicle rear side,
the second inclined guide portion is provided at a portion of the dash lower panel, which faces the second convex portion of the steering gear box from the vehicle rear side, and
a separation distance between the first convex portion and the first inclined guide portion is set shorter than a separation distance between the second convex portion and the second inclined guide portion.

4. The front structure of the vehicle body according to claim 1, wherein the front side frame comprises:
a bending starting point which is a starting point of bending and deformation when the impact load is input from the front of the vehicle; and
a subframe mounting portion which is arranged on a front side of the bending starting point and to which the front fastening portion is fastened, wherein a component mounting bracket is coupled to a rear side of the bending starting point of the front side frame, and the third inclined guide portion is provided on a front surface side of the component mounting bracket.

5. The front structure of the vehicle body according to claim 4, wherein the third inclined guide portion is provided with a recessed portion that extends in a vertical direction.

6. The front structure of the vehicle body according to claim 1, wherein the vehicle compartment front structure body comprises:

a dash lower panel separating the vehicle compartment and a front compartment on a front side of the vehicle compartment; and a dash cross member joined to a rear surface of the dash lower panel and extending along a vehicle width direction, wherein the second inclined guide portion is formed at a portion of the dash lower panel, which faces the second convex portion from the vehicle rear side, and the dash cross member is joined to a rear surface of the second inclined guide portion.

7. The front structure of the vehicle body according to claim 1, wherein the rear fastening portion comprises:

a tubular body through which a bolt penetrates in a vertical direction; and the first convex portion which protrudes from the tubular body toward the vehicle rear side, wherein the vehicle compartment front structure body comprises:

a support plate extending substantially horizontally, in which the tubular body is fastened to a lower surface of the support plate by a bolt; and the first inclined guide portion which faces the first convex portion from the vehicle rear side at a position rearward of a portion of the support plate fastened by the bolt, and against which the first convex portion is pressed when the impact load is input from the front of the vehicle.

* * * * *